US012025962B2

(12) United States Patent
Omar et al.

(10) Patent No.: US 12,025,962 B2
(45) Date of Patent: Jul. 2, 2024

(54) SEAMLESS WIRELESS CONNECTION DURING COMMISSIONING OF NETWORKED BUILDING CONTROLLERS

(71) Applicant: Honeywell International Inc., Charlotte, NC (US)

(72) Inventors: Nishant Omar, Bangalore (IN); Pawan Kumar Singh, Charlotte, NC (US); FoongYeen Chan, Petaling Jaya (MY); Priya Shukla, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 84 days.

(21) Appl. No.: 17/740,722

(22) Filed: May 10, 2022

(65) Prior Publication Data

US 2023/0221690 A1 Jul. 13, 2023

Related U.S. Application Data

(60) Provisional application No. 63/297,456, filed on Jan. 7, 2022.

(51) Int. Cl.
*G05B 19/04* (2006.01)

(52) U.S. Cl.
CPC .. *G05B 19/041* (2013.01); *G05B 2219/25011* (2013.01)

(58) Field of Classification Search
CPC ........ G05B 19/041; G05B 2219/25011; G05B 2219/2642; G05B 15/02
See application file for complete search history.

(56) References Cited

U.S. PATENT DOCUMENTS

| | | | | |
|---|---|---|---|---|
| 10,917,829 | B2 | 2/2021 | Kharvar et al. | |
| 10,979,962 | B2 | 4/2021 | Ramisetti et al. | |
| 10,982,868 | B2 | 4/2021 | Grabowski et al. | |
| 11,569,683 | B2 * | 1/2023 | Binder | G06F 3/14 |

(Continued)

FOREIGN PATENT DOCUMENTS

| | | | |
|---|---|---|---|
| CN | 111720985 | A | 9/2020 |
| CN | 211977178 | U | 11/2020 |

(Continued)

*Primary Examiner* — Christopher W Carter
(74) *Attorney, Agent, or Firm* — Seager, Tufte & Wickhem, LLP

(57) ABSTRACT

A portable handheld device pairs with a first building control device, to form a first wireless connection. The portable handheld device receives information about a second building control device via the first wireless connection, at least some of the information is received by the first building control device from the second building control device over a building control network before the first building control device provides at least some of the received information to the portable handheld device via the first wireless connection. The portable handheld device sends one or more messages to the first building control device via the first wireless connection, wherein the one or more messages cause the first building control device to communicate with the second building control device via the building control network to initiate a commissioning and/or maintenance process of the second building control device.

19 Claims, 16 Drawing Sheets

(56) References Cited

U.S. PATENT DOCUMENTS

| | | | | |
|---|---|---|---|---|
| 2009/0065578 | A1* | 3/2009 | Peterson | G05B 19/409 235/382 |
| 2011/0172842 | A1* | 7/2011 | Makhota | G05B 9/02 700/286 |
| 2016/0258638 | A1 | 9/2016 | Waseen et al. | |
| 2016/0313018 | A1 | 10/2016 | Leeland et al. | |
| 2016/0313748 | A1 | 10/2016 | Leeland et al. | |
| 2019/0132930 | A1* | 5/2019 | Vangeel | H05B 47/11 |
| 2019/0310836 | A1* | 10/2019 | Reichl | G06F 8/61 |
| 2020/0141606 | A1 | 5/2020 | Tournier et al. | |
| 2021/0007203 | A1* | 1/2021 | Pessina | G05B 15/02 |
| 2021/0014710 | A1 | 1/2021 | Raju | |
| 2021/0051538 | A1* | 2/2021 | Huang | H04W 36/14 |
| 2021/0266805 | A1 | 8/2021 | Lee et al. | |
| 2022/0197234 | A1* | 6/2022 | Patil | F24F 11/49 |

FOREIGN PATENT DOCUMENTS

| | | | |
|---|---|---|---|
| CN | 212777829 | U | 3/2021 |
| EP | 3394696 | A1 | 10/2018 |

* cited by examiner

26 —

28 — The portable handheld device pairing with a first one of the plurality of building control devices that are configured for communication with the portable handheld device, thereby forming a first wireless connection 30 — The portable handheld device receiving information about a second one of the plurality of building control devices via the first wireless connection, at least some of the information is received by the first one of the plurality of building control devices from the second one of the plurality of building control devices over the building control network before the first one of the plurality of building control devices provides at least some of the received information to the portable handheld device via the first wireless connection 32 — The portable handheld device sending one or more messages to the first one of the plurality of building control devices via the first wireless connection, wherein the one or more messages cause the first one of the plurality of building control devices to communicate with the second one of the plurality of building control devices via the building control network to initiate a commissioning and/or maintenance process of the second one of the plurality of building control devices 34 — The portable handheld device terminating the first wireless connection with the first one of the plurality of building control devices 36 — The portable handheld device pairing with another one of the plurality of building control devices that are configured for communication with the portable handheld device, thereby forming a second wireless connection 38 — The portable handheld device monitoring and/or controlling via the second wireless connection the commissioning and/or maintenance process of the second one of the plurality of building control devices that was previously initiated by the portable handheld device using the first wireless connection without having to restart the commissioning and/or maintenance process

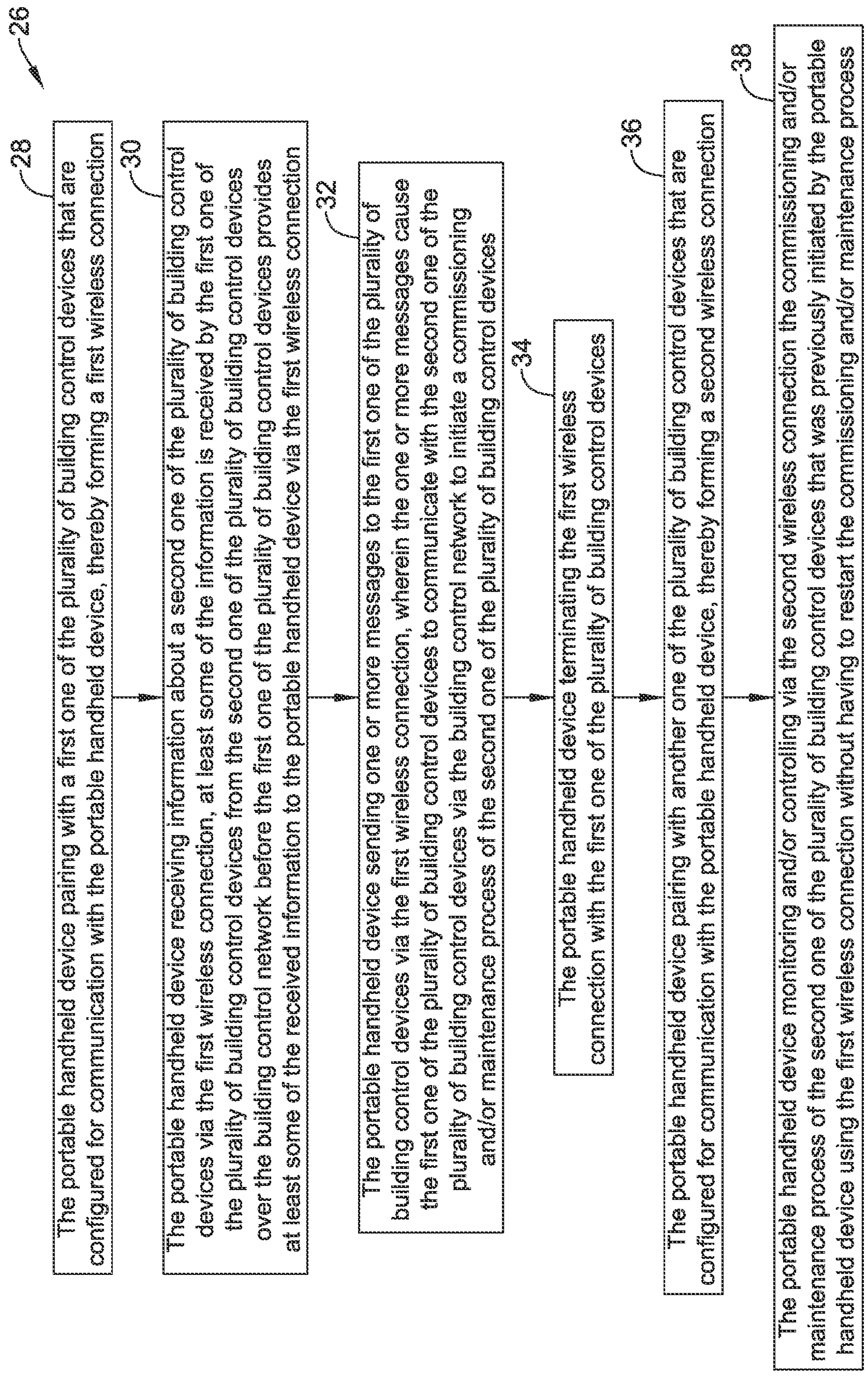

FIG. 3

```
                                    ┌─ 40
                                    ▼
┌─────────────────────────────────────────────────────────────────────────────┐ ─ 42
│ The portable handheld device pairing with a first one of the plurality of    │
│ building control devices that are configured for communication with the      │
│ portable handheld device, thereby forming a first wireless connection        │
└─────────────────────────────────────────────────────────────────────────────┘
                                    │
                                    ▼
┌─────────────────────────────────────────────────────────────────────────────┐ ─ 44
│ The portable handheld device receiving information about a second one of     │
│ the plurality of building control devices via the first wireless connection, │
│ at least some of the information is received by the first one of the         │
│ plurality of building control devices from the second one of the plurality   │
│ of building control devices over the building control network before the     │
│ first one of the plurality of building control devices provides at least     │
│ some of the received information to the portable handheld device via the     │
│ first wireless connection                                                    │
└─────────────────────────────────────────────────────────────────────────────┘
                                    │
                                    ▼
┌─────────────────────────────────────────────────────────────────────────────┐ ─ 46
│ The portable handheld device sending one or more messages to the first one  │
│ of the plurality of building control devices via the first wireless          │
│ connection, wherein the one or more messages cause the first one of the      │
│ plurality of building control devices to communicate with the second one of  │
│ the plurality of building control devices via the building control network   │
│ to initiate a commissioning and/or maintenance process of the second one of  │
│ the plurality of building control devices                                    │
└─────────────────────────────────────────────────────────────────────────────┘
                                    │
                                    ▼
┌─────────────────────────────────────────────────────────────────────────────┐ ─ 48
│ The portable handheld device monitoring a signal strength associated with    │
│ the first wireless connection and terminating the first wireless connection  │
│ when the signal strength associated with the first wireless connection falls │
│ below a threshold                                                            │
└─────────────────────────────────────────────────────────────────────────────┘
                                    │
                                    ▼
┌─────────────────────────────────────────────────────────────────────────────┐ ─ 50
│ The portable handheld device monitoring a signal strength from each of the   │
│ plurality of building control devices that are configured for communication  │
│ with the portable handheld device and pairing with another of the plurality  │
│ of building control devices that has a signal strength that is above a       │
│ threshold                                                                    │
└─────────────────────────────────────────────────────────────────────────────┘
```

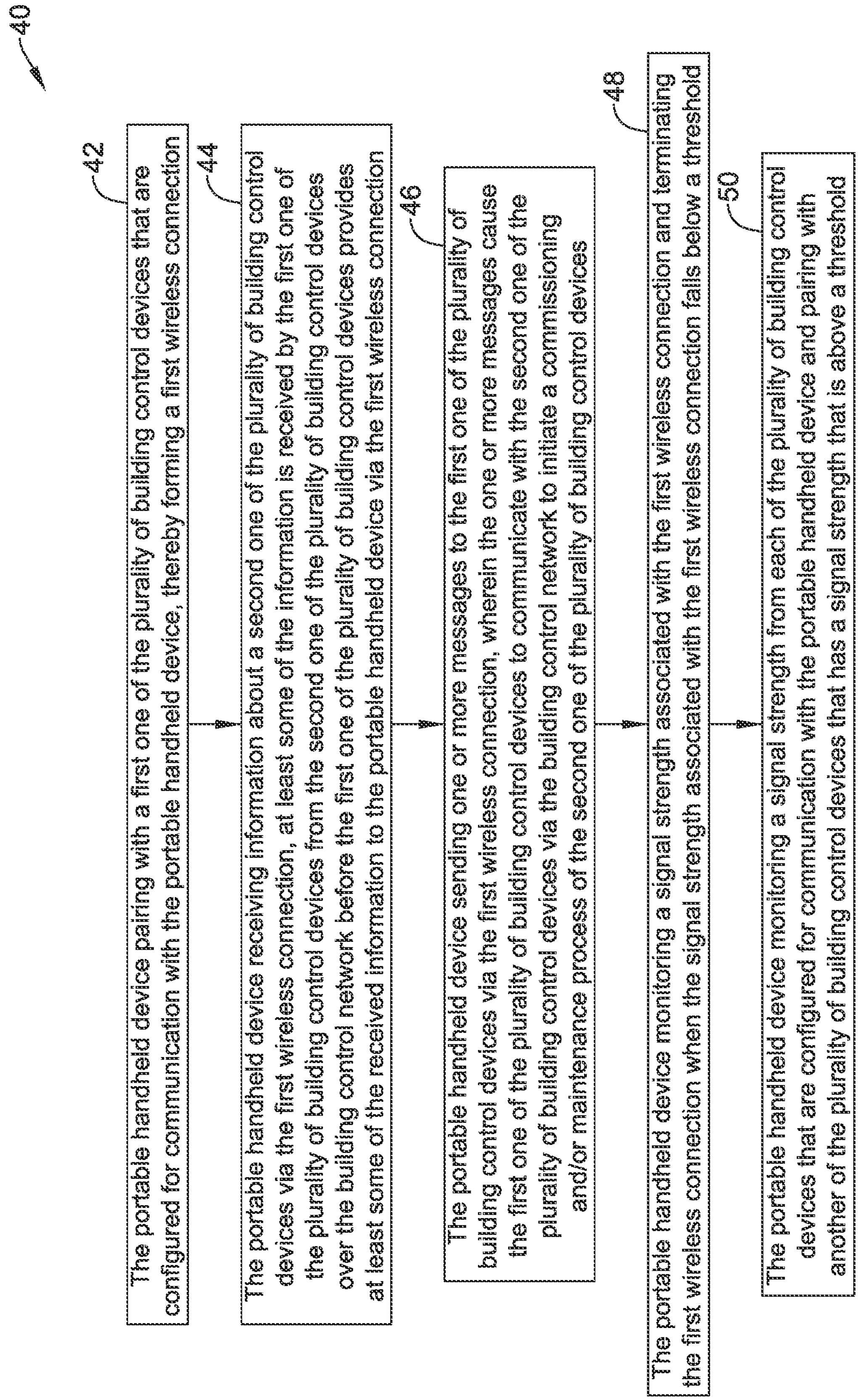

FIG. 4

SEAMLESS WIRELESS CONNECTION DURING COMMISSIONING OF NETWORKED BUILDING CONTROLLERS

RELATED APPLICATIONS

This application claims priority to U.S. Provisional Patent Application Ser. No. 63/297,456, filed Jan. 7, 2022, which application is incorporated by reference herein.

TECHNICAL FIELD

The present disclosure relates generally to commissioning and/or maintaining building controllers. More particularly, the present disclosure relates to using wireless connections during commissioning and/or maintenance of building controllers.

BACKGROUND

Building controllers are used to regulate operation of a variety of different building systems, such as but not limited to Heating, Ventilating and Air Conditioning (HVAC) systems, lighting systems, security systems and the like. Some building systems can include a large number of building controllers, each of which needs to be commissioned before the building controllers are considered fully functional and/or subsequently maintained (e.g. calibrated, re-configured, etc.). The process of commissioning and/or maintaining some building controllers can involve a technician moving around a facility and interacting individually with each of the building controllers. Because there can be a large number of building controllers in a facility that need to be commissioned and/or maintained, this be a labor intensive, time-consuming, tedious and error prone process. What would be desirable are methods and systems for using a portable handheld device to aid in commissioning and/or maintaining building controllers of a facility.

SUMMARY

The present disclosure relates generally to commissioning and/or maintaining building controllers. More particularly, the present disclosure relates to using wireless connections during commissioning and/or maintenance of building controllers. In one example, a method of using a portable handheld device to commission and/or maintain one or more of a plurality of building control devices is disclosed, where the plurality of building control devices are operably connected together via a building control network. At least some of the plurality of building control devices are configured for communication with the portable handheld device over a wireless connection. The example method includes the portable handheld device pairing with a first one of the plurality of building control devices that are configured for communication with the portable handheld device, thereby forming a first wireless connection. The portable handheld device receives information about a second one of the plurality of building control devices via the first wireless connection, at least some of the information is received by the first one of the plurality of building control devices from the second one of the plurality of building control devices over the building control network before the first one of the plurality of building control devices provides at least some of the received information to the portable handheld device via the first wireless connection. To aid in commissioning and/or maintaining the second one of the building control devices, the portable handheld device sends one or more messages to the first one of the plurality of building control devices via the first wireless connection, wherein the one or more messages cause the first one of the plurality of building control devices to communicate with the second one of the plurality of building control devices via the building control network to initiate a commissioning and/or maintenance process of the second one of the plurality of building control devices.

In some cases, the portable handheld device may terminate the first wireless connection with the first one of the plurality of building control devices, such as after initiating the commissioning and/or maintenance process of the second one of the plurality of building control devices. This may occur when, for example, the first wireless connection becomes too weak and/or unreliable or when a wireless connection to another of the plurality of building control devices that are configured to communicate with the portable handheld device over a wireless connection becomes stronger than the first wireless connection by a threshold amount. After terminating the first wireless connection, the portable handheld device may pair with another one of the plurality of building control devices that are configured for communication with the portable handheld device, thereby forming a second wireless connection. The portable handheld device may then, via the second wireless connection, monitor and/or control the commissioning and/or maintenance process of the second one of the plurality of building control devices that was initiated by the portable handheld device using the first wireless connection, without having to restarting the commissioning and/or maintenance process of the second one of the plurality of building control devices. Thus, and in some cases, initiating, monitoring and/or controlling the commissioning and/or maintenance process of the second one of the plurality of building control devices may be done over what appears to the user of the portable handheld device to be a seamless wireless connection, even though the portable handheld device may in fact be connecting and disconnecting from various ones of the plurality of building control devices that are configured for communication with the portable handheld device, particularly as the user moves about the facility.

In another example, a method of using a portable handheld device to commission and/or maintain one or more of a plurality of building control devices that are operably connected together via a building control network is disclosed, where at least some of the plurality of building control devices are configured for communication via a wireless network. The example method includes the portable handheld device selecting a building control device to communicate with based at least in part on a signal strength available for communicating over the wireless network with the selected building control device. The portable handheld device initiates a wireless connection with the selected building control device and initiates a commissioning and/or maintenance process for one or more of the plurality of building control devices, the one or more of the plurality of building control devices optionally including the selected building control device. The portable handheld device monitors a signal strength of a wireless signal emanating from at least some of the plurality of building control devices in order to ascertain relative signal strengths. When a signal strength of a wireless signal emanating from another of the plurality of building control devices is stronger than a signal strength of a wireless signal emanating from the selected building control device by at least a threshold amount, the portable handheld device automatically selects the building control device that has a stronger signal strength for the wireless signal emanating from the building control device as a newly selected building control network device, and initiates a new wireless connection with the newly selected building control device. The portable handheld device terminates the existing wireless connection with the previously selected building control device and continues via the new wireless connection the commissioning and/or maintenance process for the one or more of the plurality of building control devices that was initiated using the terminated wireless connection, without having to restarting the commissioning and/or maintenance process.

In another example, a method of performing a test and balance procedure on a plurality of Variable Air Volume (VAV) controllers that are each associated with a corresponding VAV box is disclosed. In this example, each of the VAV controllers are operably coupled via a Heating, Ventilating and Air Conditioning (HVAC) control network (e.g. BACnet), and at least some of the VAV boxes are equipped to communicate via a wireless communication protocol. The example method includes a portable handheld device selecting a VAV controller to communicate with based at least in part on a signal strength available for communicating with the selected VAV controller. The portable handheld device initiates a wireless connection with the selected VAV controller and initiating a test and balance procedure for one or more of the VAV controllers, the one or more of the VAV controllers optionally including the selected VAV controller. The portable handheld device monitors a signal strength of a wireless signal emanating from the at least some of the plurality of VAV controllers in order to ascertain relative signal strengths. When a signal strength of a wireless signal emanating from another of the plurality of VAV controllers is stronger than a signal strength of a wireless signal emanating from the selected VAV controller, the portable handheld device selects the VAV controller that has a stronger signal strength for the wireless signal emanating from the VAV controller as the newly selected VAV controller, and initiates a new wireless connection with the newly selected VAV controller. The portable handheld device terminates the existing wireless connection with the previously selected VAV controller and continues via the new wireless connection the test and balance procedure for the one or more VAV controllers that was initiated using the terminated wireless connection, without having to restarting the test and balance procedure for the one or more VAV controllers.

In another example, a non-transient, computer-readable storage medium has instructions stored thereon. When the instructions are executed by one or more processors of a portable handheld device, the one or more processors of the portable handheld device are caused to select a building control device of a plurality of building control devices to communicate with based at least in part on a signal strength available for communicating wirelessly with the selected building control device, initiate a wireless connection with the selected building control device, and initiate a commissioning and/or maintenance process for one or more of the plurality of building control devices. The one or more of the plurality of building control devices optionally including the selected building control device. The one or more processors of the portable handheld device are further caused to monitor a signal strength of a wireless signal emanating from the at least some of the plurality of building control devices in order to ascertain relative signal strengths. When a signal strength of a wireless signal emanating from another of the plurality of building control devices is stronger than a signal strength of a wireless signal emanating from the selected building control device, the one or more processors of the portable handheld device are caused to select the corresponding building control device as the newly selected building control device, terminate the existing wireless connection with the previously selected building control device, initiate a new wireless connection with the newly selected building control device, and continue via the new wireless connection the commissioning and/or maintenance process for the one or more of the plurality of building control devices that was initiated using the terminated wireless connection, without having to restarting the commissioning and/or maintenance process.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 3 is a flow diagram showing an illustrative method;

FIG. 4 is a flow diagram showing an illustrative method;

Figure 1:
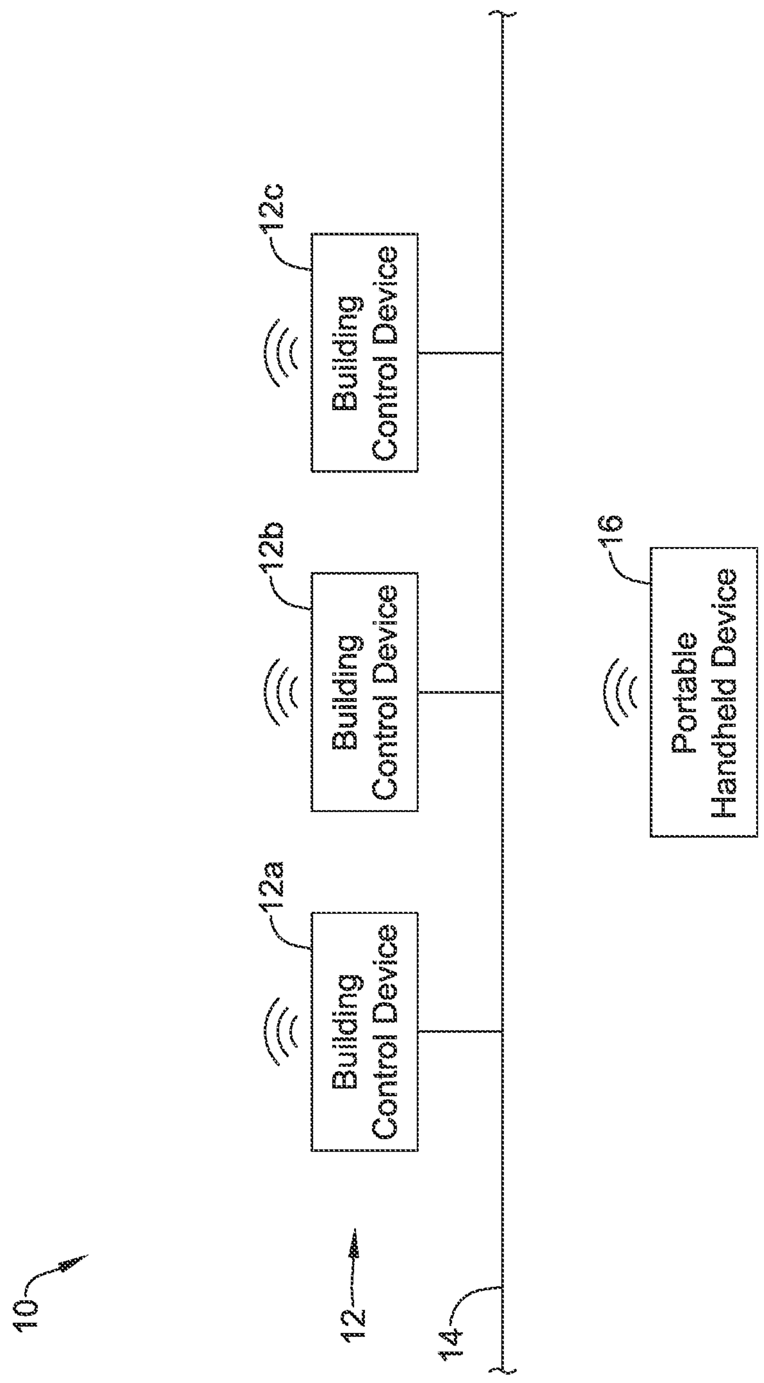
FIG. 1 is a schematic block diagram of a portion of an illustrative building control system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of a portion of an illustrative building control system 10. The building control system 10 may represent any of a variety of different building control systems, such as but not limited to HVAC systems, security systems, lighting systems and the like. As shown, the building control system 10 includes a total of three building control devices 12, individually labeled as 12*a*, 12*b* and 12*c*. This is merely illustrative, as the building control system 10 may include any number of building control devices 12, and in some cases may include substantially more than three building control devices 12.

The building control devices 12 may represent any of a variety of different types of building control devices. For example, at least some of the building control devices 12 may be building controllers such as HVAC controllers, security controllers, lighting system controllers, and the like. If HVAC controllers, at least some of the building control devices 12 may be VAV (Variable Air Volume) box controllers that are configured to control the relative air flow through a corresponding VAV box (see FIG. 2).

Each of the building control devices 12 are operably coupled with a building control network 14. The building control network 14 may be a wired network or a wireless network. In some cases, the building control network 14 may be an IP network or a BACnet network, for example. Other examples building control networks include 1-Wire, BatiBUS, C-Bus, CC-Link, DALI, Dynet, EnOcean, KNX, INSTEON, LonWorks, Modbus, TCP, oBIX, UPB, VSCP, xAP, X10, Z-Wave and Zigbee. The building control network 14 may be a combination of two or more different building networks, with some of the building control devices 12 operably coupled with a first building network and some of the building control devices 12 operably coupled with a second building network, with the first building network operably coupled with the second building network, collectively forming a building control network. These are just examples.

In addition to being able to communicate via the building control network 14, at least some of the building control devices 12 may be configured to communicate wirelessly via any of a variety of different wireless communication protocols. For example, at least some of the building control devices 12 may be configured to communicate wirelessly via a Bluetooth wireless connection. At least some of the building control devices 12 may be configured to communicate wirelessly via a WiFi wireless connection. Other wireless communication protocols are contemplated, including, for example, Zigbee, Z-Wave, Thread, DigiMesh, and MiWi.

A portable handheld device 16 may be configured to communicate wirelessly with at least some of the building control devices 12*a*-12*c*. The portable handheld device 16 may be any of a variety of different devices. In some instances, the portable handheld device 16 represents a smartphone. In some cases, the portable handheld device 16 may be a tablet or a phablet, for example. As will be discussed, the portable handheld device 16 may be used by an installer or other professional to establish communication between the portable handheld device 16 and one or more of the building control devices 12*a*-12*c* so that the portable handheld device 16, or more accurately, an application running on the portable handheld device 16, can initiate and manage any of a variety of different commissioning and/or maintenance procedures on one or more of the building control devices 12*a*-12*c*.

The portable handheld device 16 may initiate a commissioning and/or maintenance procedure on a particular building control device 12*a*-12*c* with which the portable handheld device 16 is currently communicating. The portable handheld device 16 may initiate or maintain a commissioning and/or maintenance procedure on a building control device 12*a*-12*c* that is a different building control device than the particular building control device 12*a*-12*c* with which the portable handheld device 16 is currently communicating. In one example, the portable handheld device 16 may initiate communication with a first building control device 12*a*, and may initiate a commissioning and/or maintenance procedure for the first building control device 12A. Alternatively, the portable handheld device 16 may initiate communication with a first building control device 12*a*, and may initiate a commissioning and/or maintenance procedure for a second building control device 12*b*. Alternatively, the portable handheld device 16 may initiate communication with a first building control device 12*a*, and may initiate a commissioning and/or maintenance procedure for each of a second building control device 12*b* and a third building control device 12*c*. These are just examples.

In some cases, commissioned procedures may be considered procedures that are initially performed during the commissioning of the building control system or commissioning of a building control device of the building control system in order to initially setup the building control system. Maintenance procedures may be considered procedures that are periodically and/or intermittently performed in order to maintain proper functioning of the building control system (e.g. calibrated, re-configured, etc.).

As the portable handheld device 16 moves about a facility, such as when the user carrying it moves around the room or moves from room to room, the portable handheld device 16 may terminate its wireless connection with the first building control device 12*a* and initiate communication with a second building control device 12*b* if the portable handheld device 16 loses wireless communication with the first building control device 12*a*, or if the second building control device 12*b* has a stronger wireless signal, for example. With this change in connection, the portably handheld device 16 may continue to monitor and/or control the commissioning and/or maintenance procedure(s) that were previously initiated through the wireless connection with the first building control device 12*a*, without having to restarting the commissioning and/or maintenance procedure(s) anew.

Figure 2:
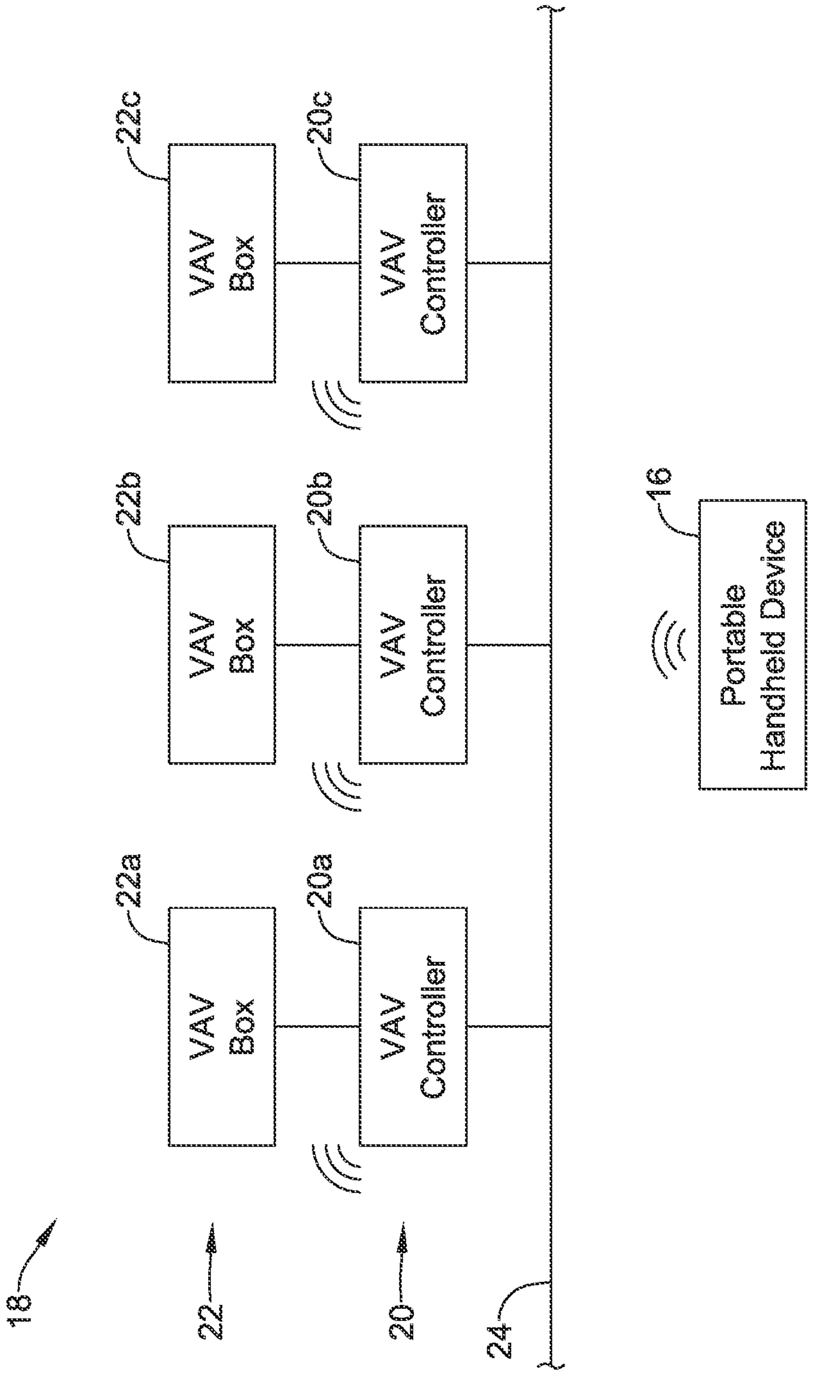
FIG. 2 is a schematic block diagram of a portion of an illustrative Heating, Ventilating and Air Conditioning (HVAC) system.

FIG. 2 is a schematic block diagram of a portion of an illustrative HVAC system 18. As shown, the HVAC system 18 includes a total of three VAV (Variable Air Volume) controllers 20, individually labeled as 20*a*, 20*b* and 20*c*. Each of the VAV controllers 20 is operably coupled with, and controls the operation of, a corresponding VAV box 22, individually labeled as 22*a*, 22*b* and 22*c*. It will be appreciated that the VAV boxes 22 receive air from an Air Handling Unit (AHU), and includes a damper that can be opened and closed to regulate the relative amount of conditioned air that flows through the VAV box 22 and into a corresponding building space. In the example shown, each VAV controller 20 controls the operation of one corresponding VAV box 22. While a total of three VAV controllers 20 and three VAV boxes 22 are shown, this is merely illustrative, as the HVAC system 18 may include any number of VAV controllers 20 and VAV boxes 22, and in many cases may include substantially more than three VAV controllers 20 and VAV boxes 22.

Each of the VAV controllers 20 are operably coupled with a HVAC control network 24. The HVAC control network 24 may be a wired network or a wireless network, and in some cases may be considered as being an example of the building control network 14 shown in FIG. 1. In some cases, the HVAC control network 24 may be an IP network or a BACnet network, for example. Other examples building control networks include 1-Wire, BatiBUS, C-Bus, CC-Link, DALI, Dynet, EnOcean, KNX, INSTEON, LonWorks, Modbus, TCP, oBIX, UPB, VSCP, xAP, X10, Z-Wave and Zigbee. The HVAC control network 24 may be a combination of two or more different building networks, with some of the VAV controllers 20 operably coupled with a first HVAC control network and some of the VAV controllers 20 operably coupled with a second HVAC control network, with the first HVAC control network operably coupled with the second HVAC control network, collectively forming an HVAC control network. These are just examples.

In addition to being able to communicate with a corresponding VAV controllers 20 and the HVAC control network 24, at least some of the VAV controllers 20 may be configured to communicate wirelessly via any of a variety of different wireless communication protocols. For example, at least some of the VAV controllers 20 may be configured to communicate wirelessly via a Bluetooth wireless connection. At least some of the VAV controllers 20 may be configured to communicate wirelessly via a WiFi wireless connection. Other wireless communication protocols are contemplated, including, for example, Zigbee, Z-Wave, Thread, DigiMesh, and MiWi.

The portable handheld device 16 may be configured to communicate wirelessly with at least some of the VAV controllers 20*a*-20*c*. The portable handheld device 16 may be any of a variety of different devices. In some instances, the portable handheld device 16, or more accurately, an application running on the portable handheld device 16, can initiate and manage any of a variety of different commissioning and/or maintenance procedures on one or more of the VAV controllers 20*a*-20*c*. The portable handheld device 16 may be used by an installer or other professional to establish communication between the portable handheld device 16 and one or more of the VAV controllers 20*a*-20*c* so that the portable handheld device 16, or more accurately, an application running on the portable handheld device 16, can initiate and manage any of a variety of different commissioning and/or maintenance procedures on one or more of the VAV controllers 20*a*-20*c*.

In some instances, the portable handheld device 16 may initiate a commissioning and/or maintenance procedure on a particular VAV controller 20 with which the portable handheld device 16 is currently wirelessly communicating. In some instances, the portable handheld device 16 may initiate or maintain a commissioning and/or maintenance procedure on a VAV controller 20 that is a different device than the particular VAV controller 20 with which the portable handheld device 16 is currently communicating. In one example, the portable handheld device 16 may initiate communication with a first VAV controller 20, and may initiate a commissioning and/or maintenance procedure for the first VAV controller 20. Alternatively, the portable handheld device 16 may initiate communication with a first VAV controller 20*a*, and may initiate a commissioning and/or maintenance procedure for a second VAV controller 20*b*. Alternatively, the portable handheld device 16 may initiate communication with a first VAV controller 20*a*, and may initiate a commissioning and/or maintenance procedure for each of a second VAV controller 20*b* and a third VAV controller 20*c*. These are just examples.

As the portable handheld device 16 moves about a facility, such as when the user carrying it moves around the room or moves from room to room, the portable handheld device 16 may terminate its wireless connection with the first VAV controller 20*a* and initiate communication with a second VAV controller 20*b* if the portable handheld device 16 loses wireless communication with the first VAV controller 20*a*, or if the second VAV controller 20*b* has a stronger wireless signal, for example. With this change in connection, the portably handheld device 16 may continue to monitor and/or control the commissioning and/or maintenance procedure(s) that were previously initiated through the wireless connection with the first VAV controller 20*a*, without having to restarting the commissioning and/or maintenance procedure (s) anew.

FIG. 3 is a flow diagram showing an illustrative method 26 of using a portable handheld device (such as the portable handheld device 16) to commission and/or maintain one or more of a plurality of building control devices (such as the building control devices 12 and/or VAV controllers 20) that are operably connected together via a building control network (such as the building control network 14), where at least some of the plurality of building control devices configured for communication with the portable handheld device over a wireless connection (such as Bluetooth or Wifi).

The illustrative method includes the portable handheld device pairing with a first one of the plurality of building control devices that are configured for communication with the portable handheld device, thereby forming a first wireless connection, as indicated at block 28. The portable handheld device receives information about a second one of the plurality of building control devices via the first wireless connection. At least some of the information is received by the first one of the plurality of building control devices from the second one of the plurality of building control devices over the building control network before the first one of the plurality of building control devices provides at least some of the received information to the portable handheld device via the first wireless connection, as indicated at block 30.

To aid in commissioning and/or maintaining the second one of the building control devices, the portable handheld device sends one or more messages to the first one of the plurality of building control devices via the first wireless connection, wherein the one or more messages cause the first one of the plurality of building control devices to communicate with the second one of the plurality of building control devices over the building control network to initiate a commissioning and/or maintenance process of the second one of the plurality of building control devices, as indicated at block 32. In some cases, the messages that are communicated over the first wireless connection may be in a different format than the messages communicated over the building control network. For example, the messages communicated over the first wireless network may be in a JSON (JavaScript Object Notation) format, and the messages over the building control network may be in a BACnet format. When so provided, the first one of the plurality of building control devices includes a translator that translates the JSON messages received from the portable handheld device over the first wireless connection into appropriate BACnet messages, and provide the BACnet messages to the second one of the plurality of building control devices over the building control network. For return messages from the second one of the building control devices, the translator may translate return BACnet messages received from the second one of the plurality of building control devices via the building control network into appropriate JSON messages, and send the JSON messages to the portable handheld device over the first wireless connection.

In some cases, the second one of the plurality of building control devices includes a Variable Air Volume (VAV) controller associated with a VAV box, and the commissioning and/or maintenance process includes a test and balance procedure for the Variable Air Volume (VAV) controller. In some cases, the wireless connection may be a Bluetooth connection and the building control network may include a BACnet network.

The portable handheld device may terminate the first wireless connection with the first one of the plurality of building control devices, as indicated at block 34. The portable handheld device may pair with another one of the plurality of building control devices that are configured for communication with the portable handheld device, thereby forming a second wireless connection, as indicated at block 36. The portable handheld device may continue to monitor and/or control via the second wireless connection the commissioning and/or maintenance process of the second one of the plurality of building control devices that was previously initiated by the portable handheld device using the first wireless connection, without having to restarting the commissioning and/or maintenance process, as indicated at block 38.

FIG. 4 is a flow diagram showing an illustrative method 40 of using a portable handheld device (such as the portable handheld device 16) to commission and/or maintain one or more of a plurality of building control devices (such as the building control devices 12) that are operably connected together via a building control network (such as the building control network 14). At least some of the plurality of building control devices are configured for communication with the portable handheld device over a wireless connection.

The illustrative method includes the portable handheld device pairing with a first one of the plurality of building control devices that are configured for communication with the portable handheld device, thereby forming a first wireless connection, as indicated at block 42. The portable handheld device receives information about a second one of the plurality of building control devices via the first wireless connection. At least some of the information is received by the first one of the plurality of building control devices from the second one of the plurality of building control devices over the building control network before the first one of the plurality of building control devices provides at least some of the received information to the portable handheld device via the first wireless connection, as indicated at block 44.

In this example method, the portable handheld device sends one or more messages to the first one of the plurality of building control devices via the first wireless connection, wherein the one or more messages cause the first one of the plurality of building control devices to communicate with the second one of the plurality of building control devices via the building control network to initiate a commissioning and/or maintenance process of the second one of the plurality of building control devices, as indicated at block 46.

In some cases, the portable handheld device monitors a signal strength associated with the first wireless connection, and terminates the first wireless connection when the reliability of the first wireless connection drops below a threshold, as indicated at block 48. Parameters that may be monitored to identify the reliability of the first wireless connection can include signal strength, signal-to-noise-ratio (SNR), bit-error-rate (BER), distortion, jitter, etc. The threshold may be a factory set parameters, or may be a field-adjustable parameter. In some instances, the method 40 may include the portable handheld device monitoring a signal strength from each of the plurality of building control devices that are configured for communication with the portable handheld device, and pairing with another of the plurality of building control devices that has a signal strength that is above a threshold or a signal strength that is higher than the signal strength of the signal of the first wireless connection, as indicated at block 50.

Figure 5:
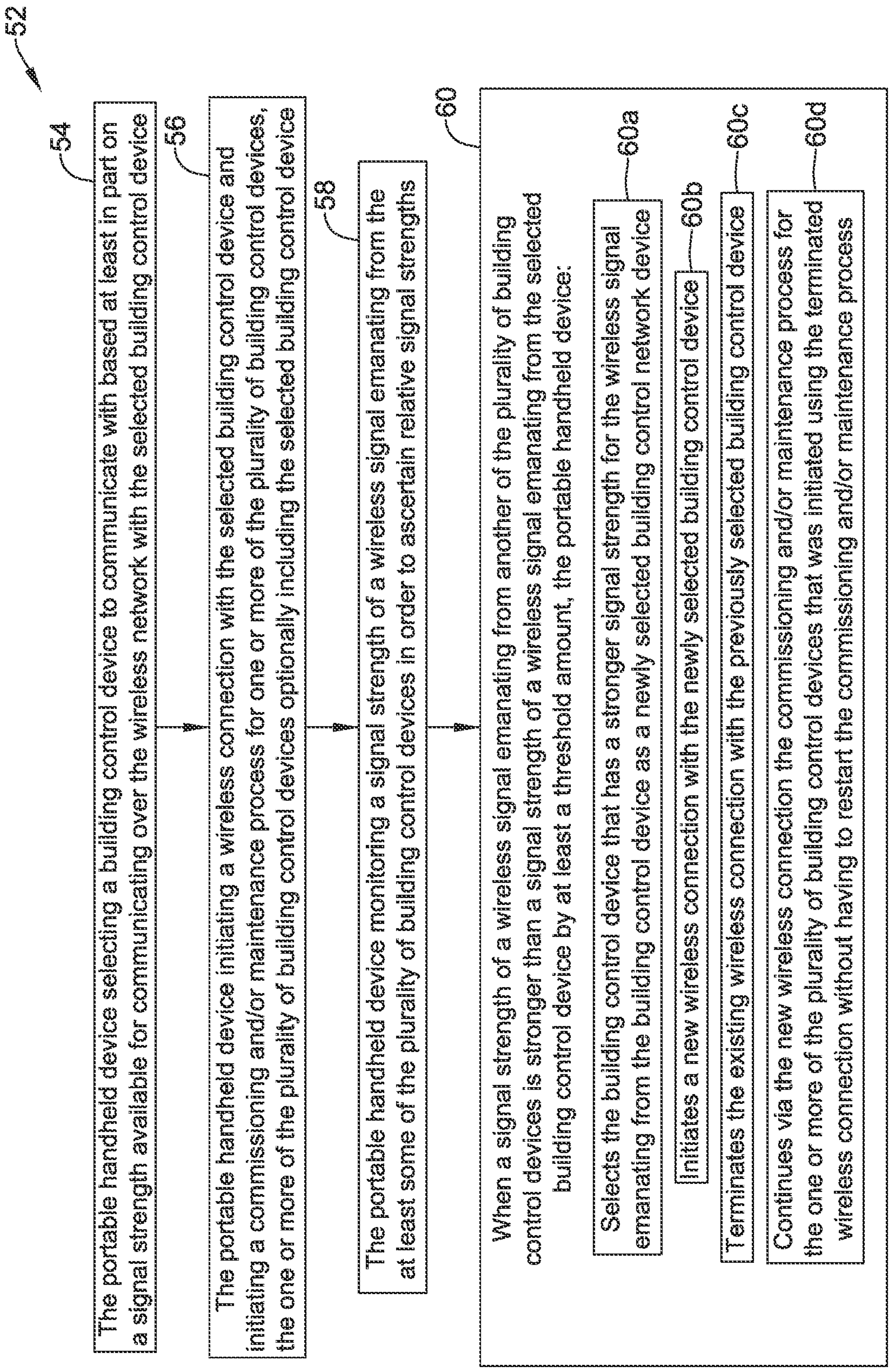
FIG. 5 is a flow diagram showing an illustrative method.

FIG. 5 is a flow diagram showing an illustrative method 52 of using a portable handheld device (such as the portable handheld device 16) to commission and/or maintain one or more of a plurality of building control devices (such as the building control devices 12) that are operably connected together via a building control network (such as the building control network 14). At least some of the plurality of building control devices are configured for communication via a wireless network. The illustrative method 52 includes the portable handheld device selecting a building control device to communicate with, based at least in part on a signal strength available for communicating over the wireless network with the selected building control device, as indicated at block 54. The portable handheld device initiates a wireless connection with the selected building control device and initiates a commissioning and/or maintenance process for one or more of the plurality of building control devices. The one or more of the plurality of building control devices optionally including the selected building control device, as indicated at block 56.

The portable handheld device monitors a signal strength of a wireless signal emanating from the at least some of the plurality of building control devices in order to ascertain relative signal strengths, as indicated at block 58. When a signal strength of a wireless signal emanating from another of the plurality of building control devices is stronger than a signal strength of a wireless signal emanating from the selected building control device by at least a first threshold amount and/or is above a second threshold amount, and as indicated at block 60, the portable handheld device takes several actions. In some cases, the portable handheld device selects the building control device that has a stronger signal strength for the wireless signal emanating from the building control device as a newly selected building control network device, as indicated at block 60*a*. The portable handheld device initiates a new wireless connection with the newly selected building control device, as indicated at block 60*b*. The portable handheld device terminates the existing wireless connection with the previously selected building control device, as indicated at block 60*c*. The portable handheld device continues via the new wireless connection the commissioning and/or maintenance process for the one or more of the plurality of building control devices that was initiated using the terminated wireless connection, without having to restarting the commissioning and/or maintenance process anew, as indicated at block 60*e*.

The portable handheld device may be configured to communicate wirelessly with the selected building control device, and the selected building control device may allow the portable handheld device to communicate with other building control devices over the building control network. However, once the portable handheld device terminates the existing wireless connection with the selected building control device, and initiates the new wireless connection with the newly selected building control device, the portable handheld device communicates wirelessly with the newly selected building control device, and the newly selected building control device allows the portable handheld device to communicate with the other building control devices over the building control network. In some instances, the wireless network includes a Bluetooth or a WiFi network.

The commissioning and/or maintenance process may include an install and checkout procedure. As an example, an install and checkout procedure for a particular building control device may include configuring a point type. The install and checkout procedure for a particular building control device may include configuring a point behavior, for example.

In some instances, the selected building control device may be a Variable Air Volume (VAV) controller associated with a VAV box, and the commissioning and/or maintenance process may include a test and balance procedure for the Variable Air Volume (VAV) controller. In some cases, the plurality of building control devices include a plurality of VAV controllers that are each associated with a corresponding VAV box, and wherein the test and balance procedure includes the user physically moving between VAV boxes in order to manually measure air flow at each of the VAV boxes. The relative signal strength of the wireless signals emanating from at least some of the plurality of building control devices, as measured at the portable handheld device, will tend to vary as a user moves the portable handheld device about the space and measures air flow at each of the VAV boxes. As the user moves, the portable handheld device may change pairings with various of the plurality of building control devices.

Figure 6:
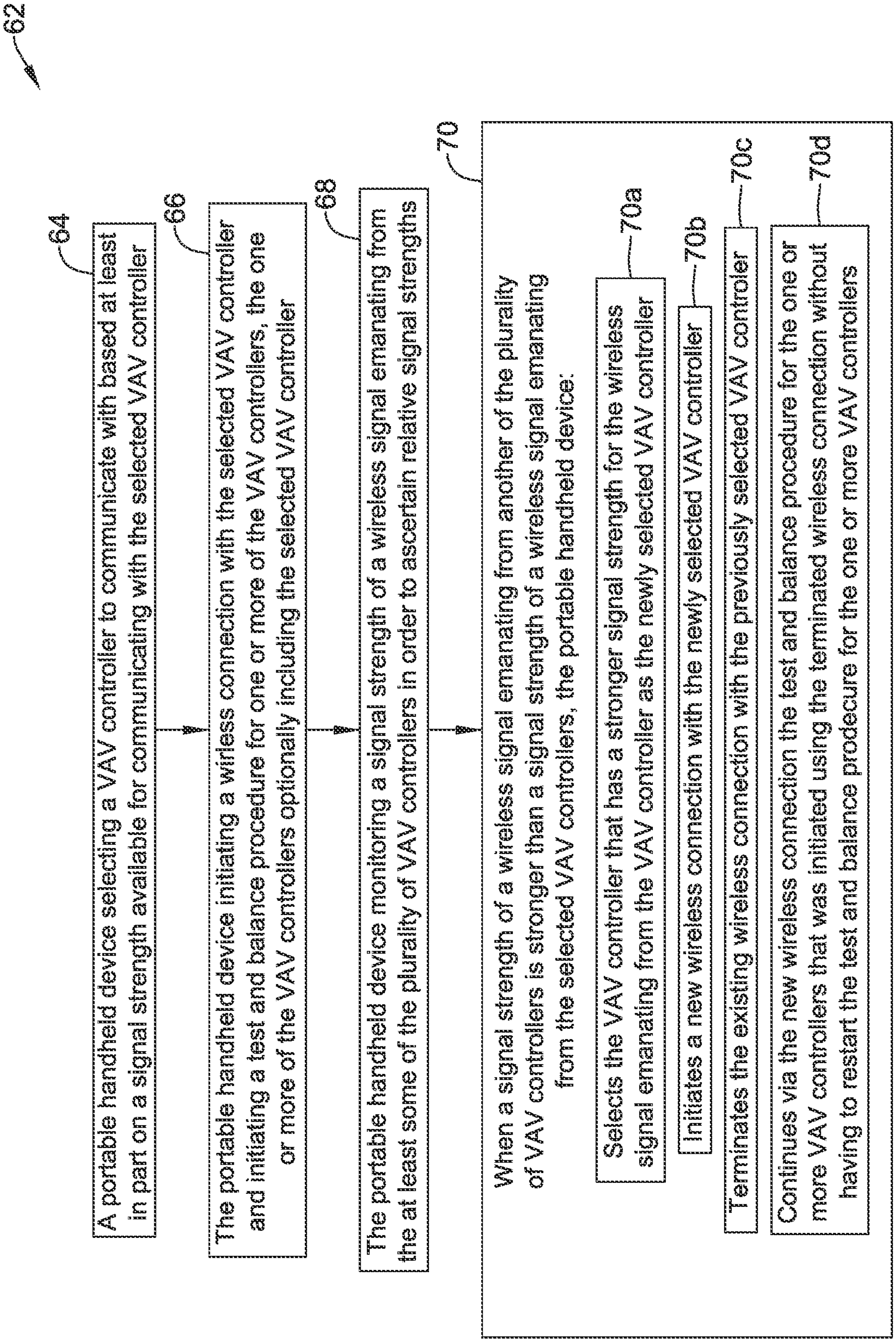
FIG. 6 is a flow diagram showing an illustrative method.

FIG. 6 is a flow diagram showing an illustrative method 62 of performing a test and balance procedure on a plurality of VAV controllers (such as the VAV controllers 20) that are each associated with a corresponding VAV box (such as the VAV boxes 22), each of the VAV controllers operably coupled via a HVAC control network (such as the HVAC control network 24). At least some of the VAV boxes equipped to communicate via a wireless communication protocol. The illustrative method 62 includes a portable handheld device selecting a VAV controller to communicate with based at least in part on a signal strength available for communicating with the selected VAV controller, as indicated at block 64. The portable handheld device initiates a wireless connection with the selected VAV controller and initiating a test and balance procedure for one or more of the VAV controllers, the one or more of the VAV controllers optionally including the selected VAV controller, as indicated at block 66. The portable handheld device monitors a signal strength of a wireless signal emanating from the at least some of the plurality of VAV controllers in order to ascertain relative signal strengths, as indicated at block 68.

When a signal strength of a wireless signal emanating from another of the plurality of VAV controllers is stronger than a signal strength of a wireless signal emanating from the selected VAV controllers by at least a first threshold amount and/or is above a second threshold amount, and as indicated at block 60, the portable handheld device takes several actions, as indicated at block 70. In some cases, the portable handheld device selects the VAV controller that has a stronger signal strength for the wireless signal emanating from the VAV controller as the newly selected VAV controller, as indicated at block 70*a*. The portable handheld device initiates a new wireless connection with the newly selected VAV controller, as indicated at block 70*b*. The portable handheld device terminates the existing wireless connection with the previously selected VAV controller, as indicated at block 70*c*. The portable handheld device continues via the new wireless connection the test and balance procedure for the one or more VAV controllers that was initiated using the terminated wireless connection, without having to restarting the test and balance procedure for the one or more VAV controllers, as indicated at block 70*d*.

In some instances, the test and balance procedure includes moving between VAV boxes in order to measure air flow at each of the VAV boxes, and the relative signal strength of the wireless signals emanating from at least some of the plurality of VAV controllers as measured at the portable handheld device varies as a user moves the portable handheld device as they measure air flow at each of the VAV boxes. As such, as the user moves, the portable handheld device may change pairings with various of the plurality of VAV controllers.

The portable handheld device may be configured to communicate wirelessly with the selected VAV controller, and the selected VAV controller may be configured to act as an intermediary between the portable handheld device and the other VAV controllers. The portable handheld device may be configured to communicate wirelessly with the newly selected VAV controller, and the newly selected VAV controller is configured to act as an intermediary between the portable handheld device and the other VAV controllers. The wireless connection may, for example, include a Bluetooth connection or a Wifi connection.

Figure 7:
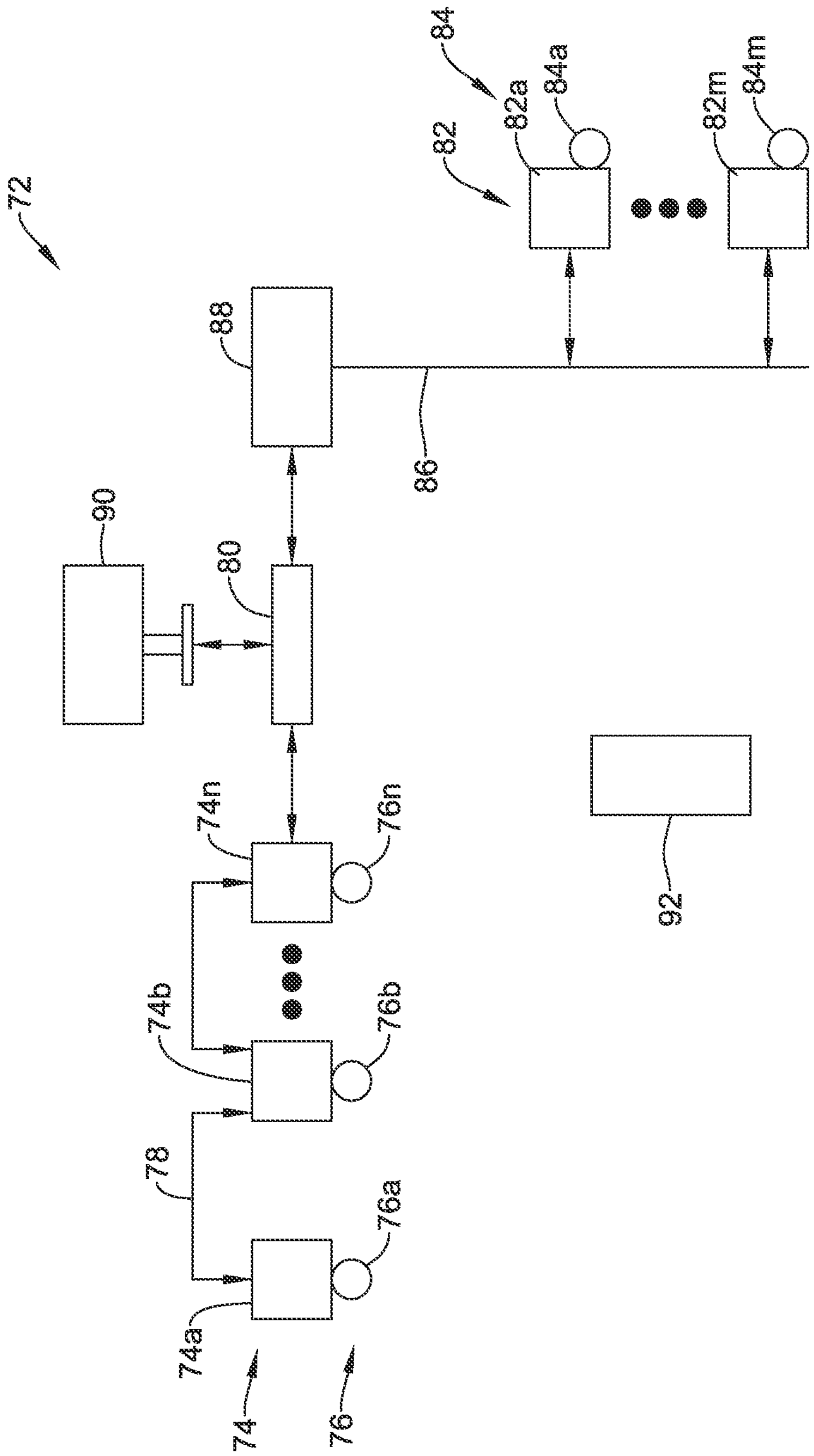
FIG. 7 is a schematic block diagram of a portion of an illustrative HVAC system.

FIG. 7 is a schematic block diagram of a portion of an illustrative HVAC system 72. The HVAC system 72 may be considered as being an example of the building control system 10 (FIG. 1) or the HVAC system 18 (FIG. 2). The HVAC system 72 includes several VAV controllers 74, individually labeled as 74*a*, 74*b* and through 74*n*, that are each coupled with a corresponding VAV box 76, individually labeled as 76*a*, 76*b* and through 76*n*. As shown, each of the VAV controllers 74 are operably coupled with an IP network 78 that extends to an ethernet switch 80.

The HVAC system 72 also includes a number of VAV controllers 82, individually labeled as 82*a* through 82*m*, that are each coupled with a corresponding VAV box 84, individually labeled as 84*a* through 84*m*. As shown, each of the VAV controllers 82 are operably coupled with a BACnet network 86 that extends to a plant controller/router 88 and hence to the ethernet switch 80. It will be appreciated that the IP network 78 and the BACnet network 86 together functionally form a network such as the building control network 14 (FIG. 1) or the HVAC control network 24 (FIG. 2). The ethernet switch 80 operably couples to a supervisory computer 90. A smartphone 92, which may be considered as being an example of the portable handheld device 16, may be used to communicate with one or more of the VAV controllers 74 and/or the VAV controllers 82 while carrying out commissioning and/or maintenance procedures on any of the VAV controllers 74 and/or the VAV controllers 82.

Figure 8:
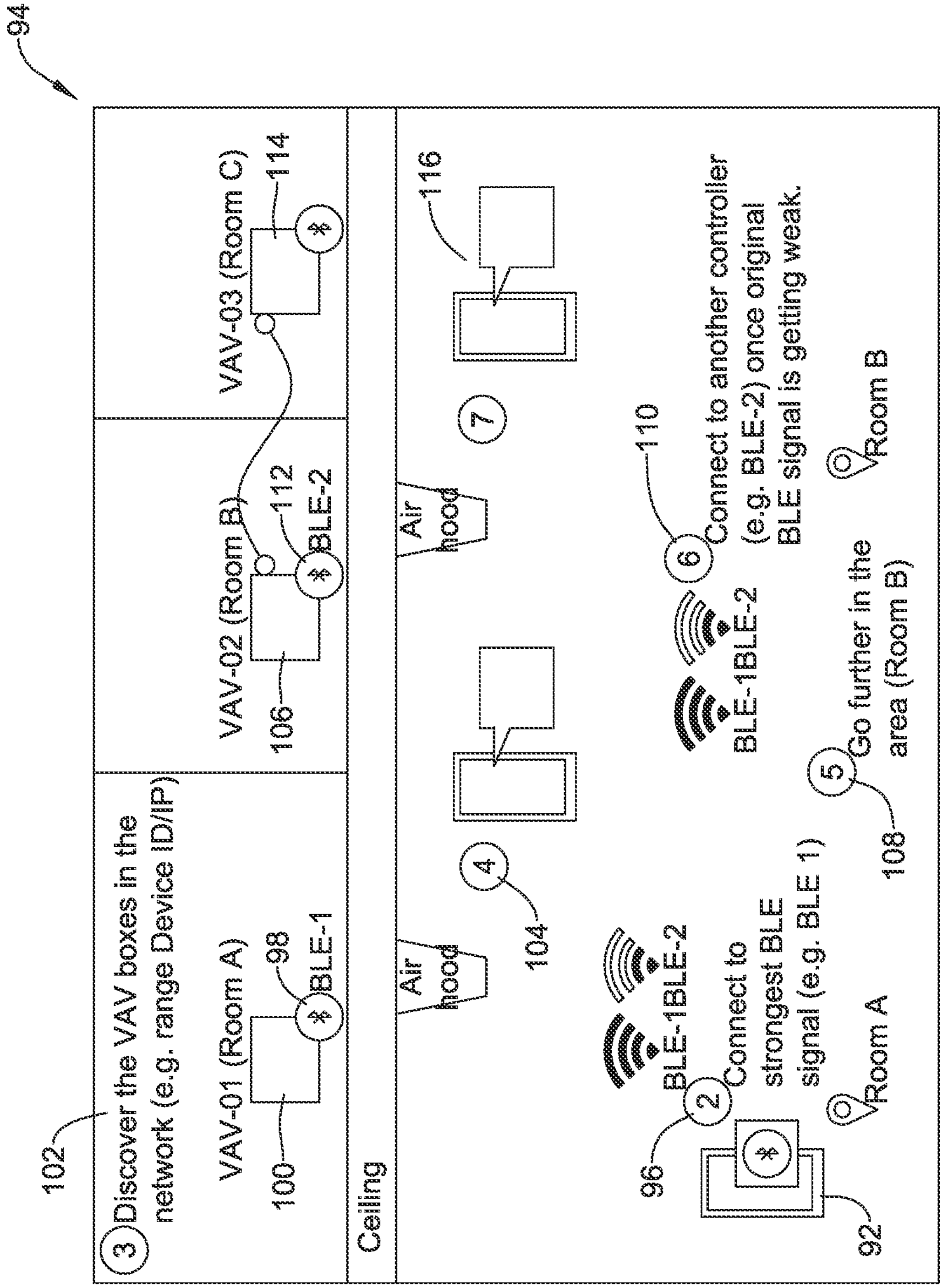
FIG. 8 is a schematic diagram showing an illustrative method.

FIG. 8 is a schematic diagram showing an illustrative method 94 of using a portable handheld device (such as the portable handheld device 16 or the smartphone 92) to carry out commissioning and/or maintenance procedures. In this particular example, the commissioning and/or maintenance procedure is a Test and Balance procedure. Step One is for an installer or other professional to take their portable handheld device, equipped with an appropriate application, to an area where the VAV controllers are located. At this point, the installer or other professional is in Room A. Step Two, indicated at point 96, is to use the portable handheld device to connect to the strongest BLE (Bluetooth Low Energy) signal, which in this case is BLE 1, labeled as 98. BLE 1, labeled as 98, corresponds to a VAV controller and box assembly 100 that is located within Room A.

Step Three, indicated at point 102, is to use the smartphone 92 and the BLE connection established with BLE 1, labeled as 98, to discover the other VAV assemblies that are on an HVAC control network. The installer or other professional then selected VAV-1 and VAV-2 from the discovered VAV assemblies using the application running on the smartphone 92 to initiate a Test and Balance procedure on these assemblies (not shown). Step Four, indicated at point 104, is to have the installer or other professional balance and measure the airflow provided by selected VAV controller and box assembly 100 (VAV-1) in Room A and a VAV controller and box assembly 106 (VAV-2) in Room B. Airflow may be measured using a portable air hood and the measured airflow values can be entered into the application running on the smartphone 92.

Step Five, indicated at point 108, is to go further into Room B as the installer or other professional approaches other VAV assemblies. At Step Six, indicated at point 110, the smartphone 92 automatically connects to another VAV controller because that other VAV controller has a stronger BLE signal than the VAV controller to which the smartphone 92 has been connected to. This can happen as the installer or other professional moves around, as BLE has a relatively limited effective range. The smartphone 92 has now connected to BLE 2, labeled as 112, in order to continue performing Test and Balance procedures, including continue to monitor and/or control those Test and Balance procedures initiated using a previous wireless connection.

In some cases, as shown, a VAV assembly 114, located in a Room C, does not have BLE ability. In this case, the smartphone 92 may communicate wirelessly with the VAV assembly 106, which can in turn communicate with the VAV assembly 114 via an HVAC control network to which both the VAV assembly 106 and the VAV assembly 114 are connected. As shown at Step Seven, indicated at point 116, the installer or other professional may continue performing Test and Balance procedures on other VAV assemblies that were discovered.

Figure 9:
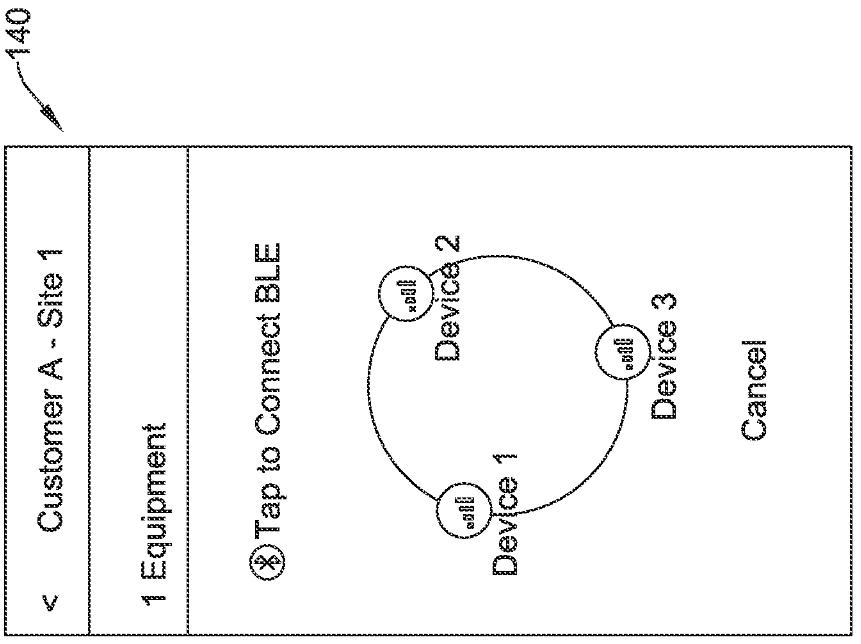
FIGS. 9 through 18 are illustrative screen shots from a portable handheld device.

FIGS. 9 through 18 are screen captures of illustrative screens that may be displayed by an application running on a portable handheld device in conducting a Test and Balance procedure. In FIG. 9, a screen 140 provides a user with the ability to connect to one of several BLE devices including DEVICE ONE, DEVICE TWO and DEVICE THREE. In this particular example, each of the BLE devices appears to have a similarly strong BLE signal, and thus the user could select any of the BLE devices. The user can simply tap one of the discovered BLE devices to pair the portable handheld device with the selected BLE device.

Figure 10:
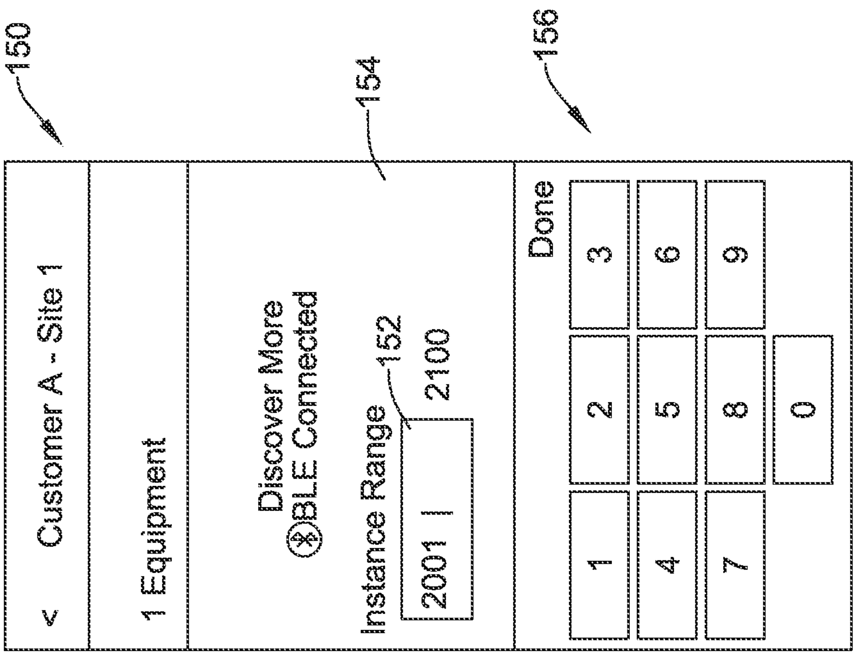

FIG. 10 provides a screen 150 that allows the user, once the portable handheld device is paired with a selected BLE (as shown, a device labeled ABCDEFGHIJ), to discover additional devices that may be on a building control system network or an HVAC system network, for example. In some cases, the user is able to select a range of devices addresses or instance names to look for, between a starting point 152 and an ending point 154, and thus the screen 150 may include an alphanumeric keyboard 156 that allows the user to enter the desired range.

Figure 11:
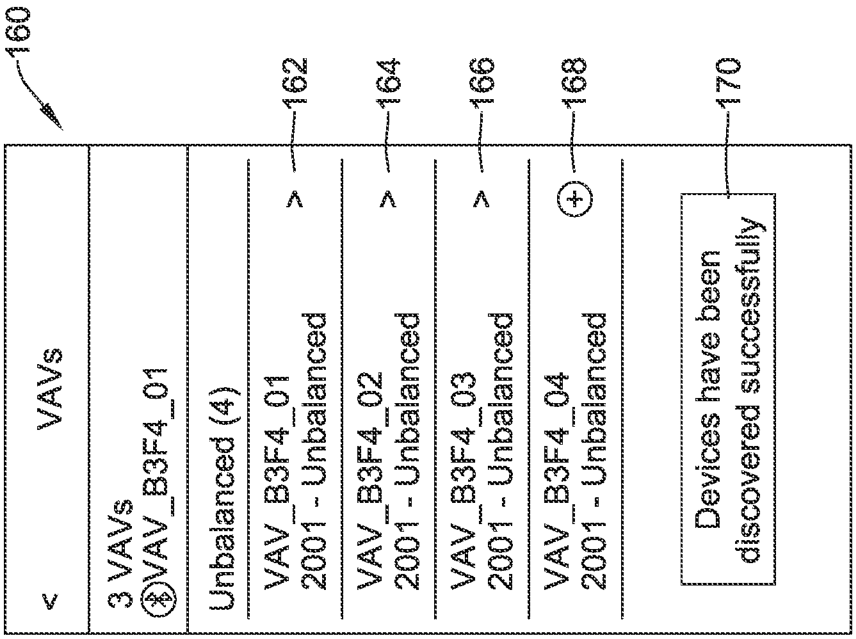

FIG. 11 provides a screen 160 that shows the results of a search for additional devices that have been discovered on the building control network. In this particular example, several devices labeled 162, 164, 166 and 168 have been discovered. A popup 170 confirms that these devices have been successfully discovered. As shown, the devices 162, 164 and 166 have not yet been balanced (labeled "Unbalanced"), and thus are candidates for running a Test and Balance procedure.

Figure 12:
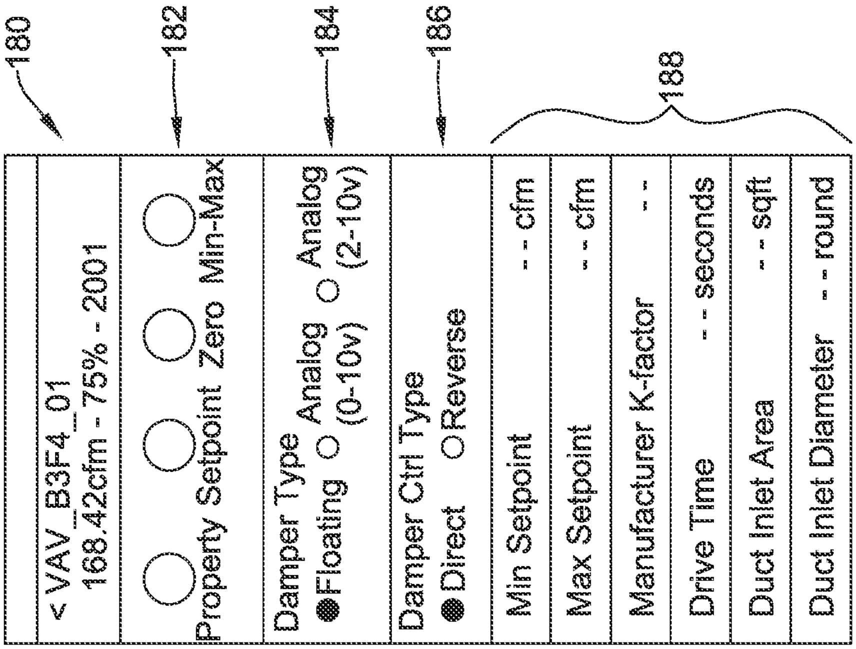

FIG. 12 provides a screen 180 that may be displayed if, for example, the user selected the device 162 from the screen 160 (FIG. 11). The user can choose between displaying property, setpoint, zero or min-max parameters by selecting an appropriate icon in a toolbar 182. As shown, the property icon is highlighted and has been selected. The user is able to select a Damper Type 184 as well as a Damper Control Type 186. As shown, the user has selected a Floating damper type and Direct damper control. A region 188 provides a number of properties and corresponding values.

Figure 13:
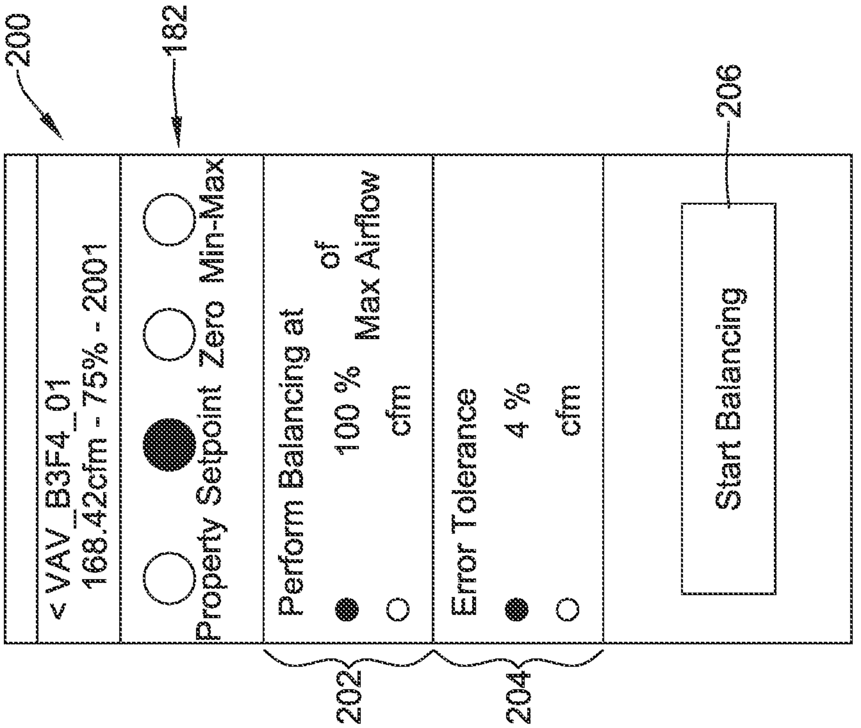

FIG. 13 provides a screen 200 that may be displayed if, for example, the user selects the setpoint icon within the toolbar 182. The user is able to select between performing balancing at a percentage of max airflow, or at a particular air flow rate, using radio buttons 202. The user is able to make a corresponding selection for how the error tolerance is defined using radio buttons 204. The screen 200 includes a START BALANCING button 206 that may be selected in order to begin a Test and Balance procedure for that particular device.

Figure 14:
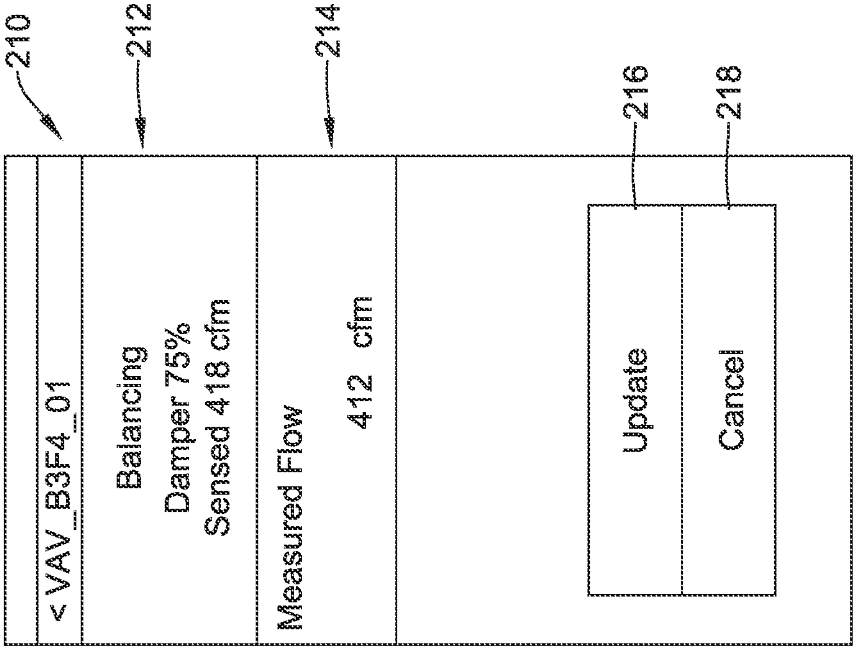

FIG. 14 provides a screen 210 that shows intermediate results during a Test and Balance procedure. The screen 210 includes a damper position and corresponding sensed airflow 212 and a measured airflow 214. The measured airflow 214 may be determined using a portable air hood, for example, and then entered into the application. An UPDATE button 216 may be selected if desired, or a CANCEL button 218 may be selected.

Figure 15:
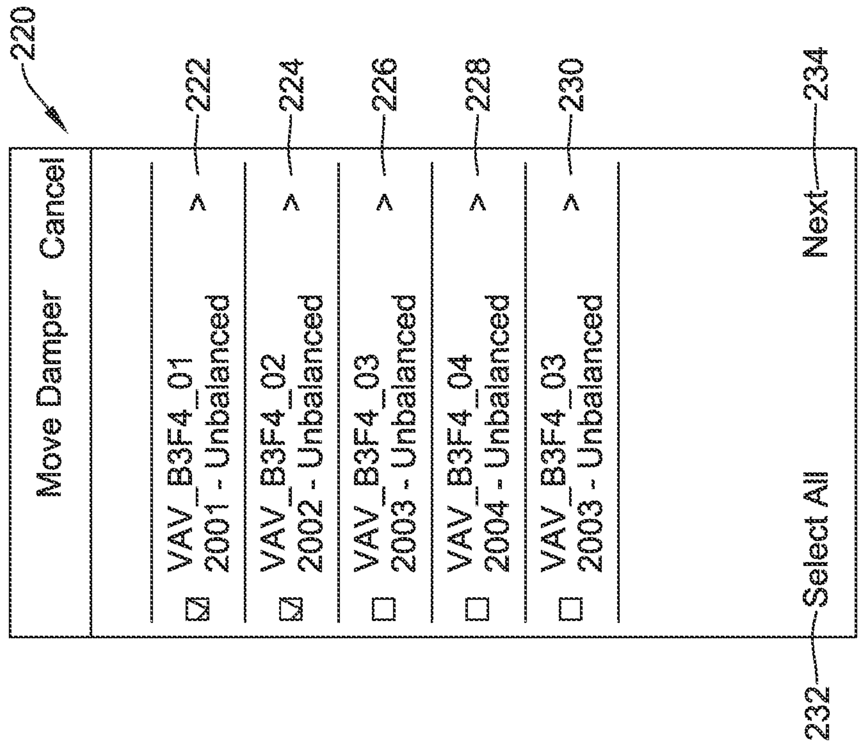

FIG. 15 provides a screen 220 that shows a list of VAV assemblies that have not yet been balanced. As shown, a VAV assembly 222 and a VAV assembly 224 have been selected while VAV assemblies 226, 228 and 230 have not been selected. In some cases, Test and Balance procedures may be performed in a batch mode, meaning that multiple VAV assemblies are undergoing a Test and Balance procedure at the same time. This means that the user can move from VAV assembly to VAV assembly testing actual air flow with a portable air hood, with each VAV assembly already set to a particular performance criteria, such as damper position, air flow, and the like. The screen 220 includes a Select All button 232, which allows the user to quickly select all, and a Next button 234.

Figure 16:
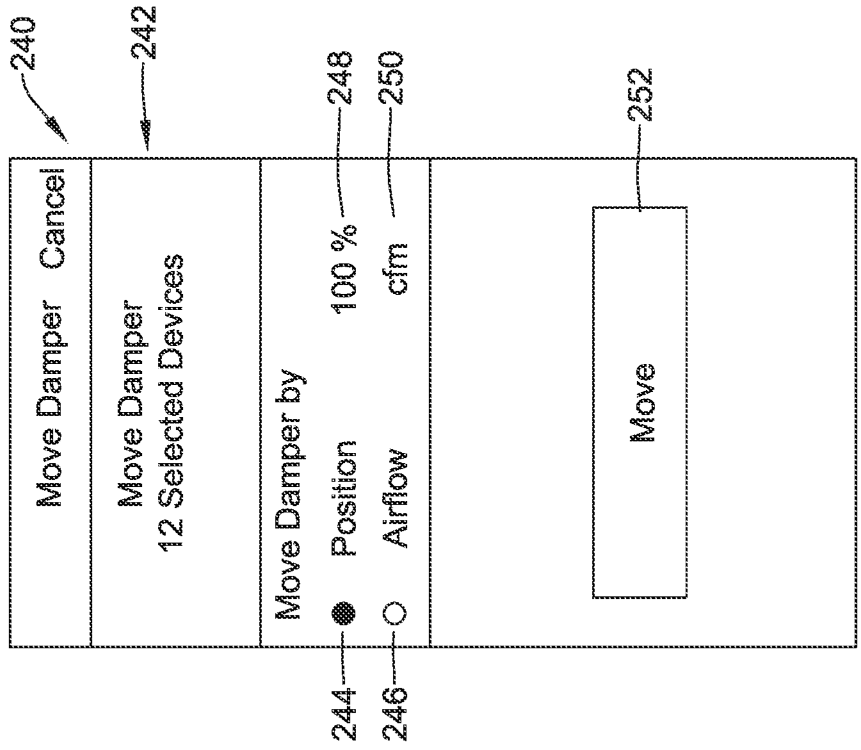

FIG. 16 provides a screen 240 that may be displayed. An information flag 242 informs the user that 12 dampers have been selected. The user is able to select between moving each of the 12 selected dampers by position or by airflow, using radio buttons 244 and 246, respectively. The user is able to enter a corresponding value using boxes 248 and 250, respectively. As shown, the user has selected to move the 12 selected dampers by position, and in particular to fully open all 12 of the selected dampers. A MOVE button 252 allows the user to instruct the 12 selected dampers to take the commanded action.

Figure 17:
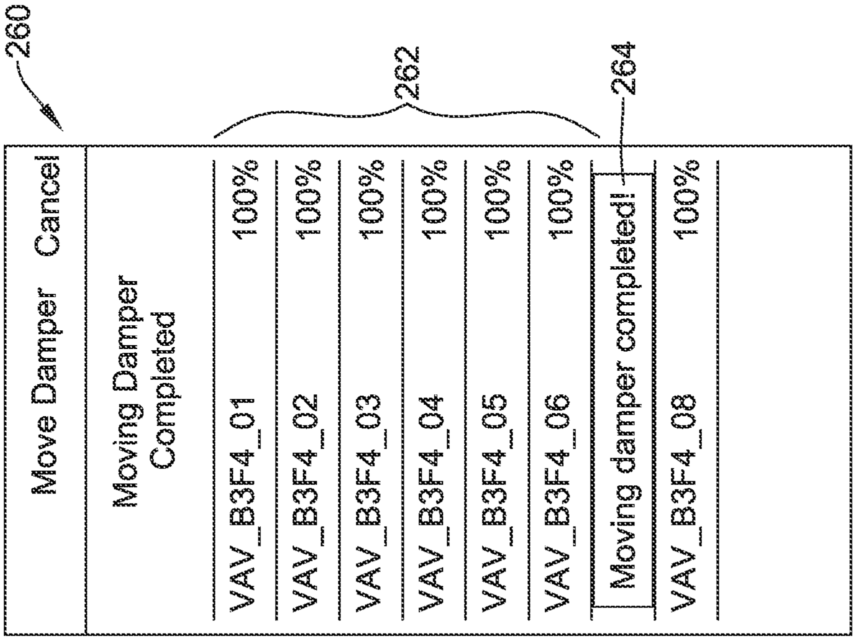

FIG. 17 provides a screen 260 that may be displayed after the 12 selected dampers have been moved to the commanded 100% open position. The screen 260 includes a list 262 of the selected dampers, along with their current positions. A popup 264 provides additional confirmation to the user.

Figure 18:
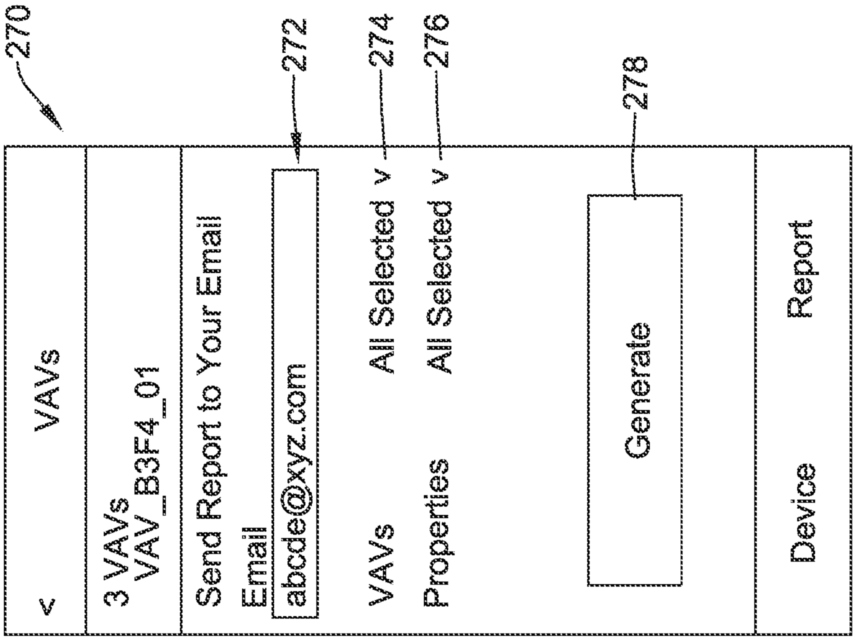

FIG. 18 provides a screen 270 that may be displayed. The screen 270 allows the user to have a report summarizing the completed Test and Balance procedures to be sent to their email, for example. A box 272 allows the user to enter their email address. Sections 274 and 276 allow the user to clarify which VAV assemblies are to be included in the report, and which particular properties are to be included, respectively. A GENERATE button 278 may be selected in order to generate the report and to send the report to the indicated email address. While email is shown, it is contemplated that a report may be sent via text message to a cell phone, for example. The report may include a digital record of the balancing activities, including but not limited to balancing method, airflow results, calibration used, time/date stamps and identity of the user who is going to sign off. The report can be generated with a single click of a button in the mobile application, thereby capturing electronically all the information that today may be recorded manually.

Figure 19A:
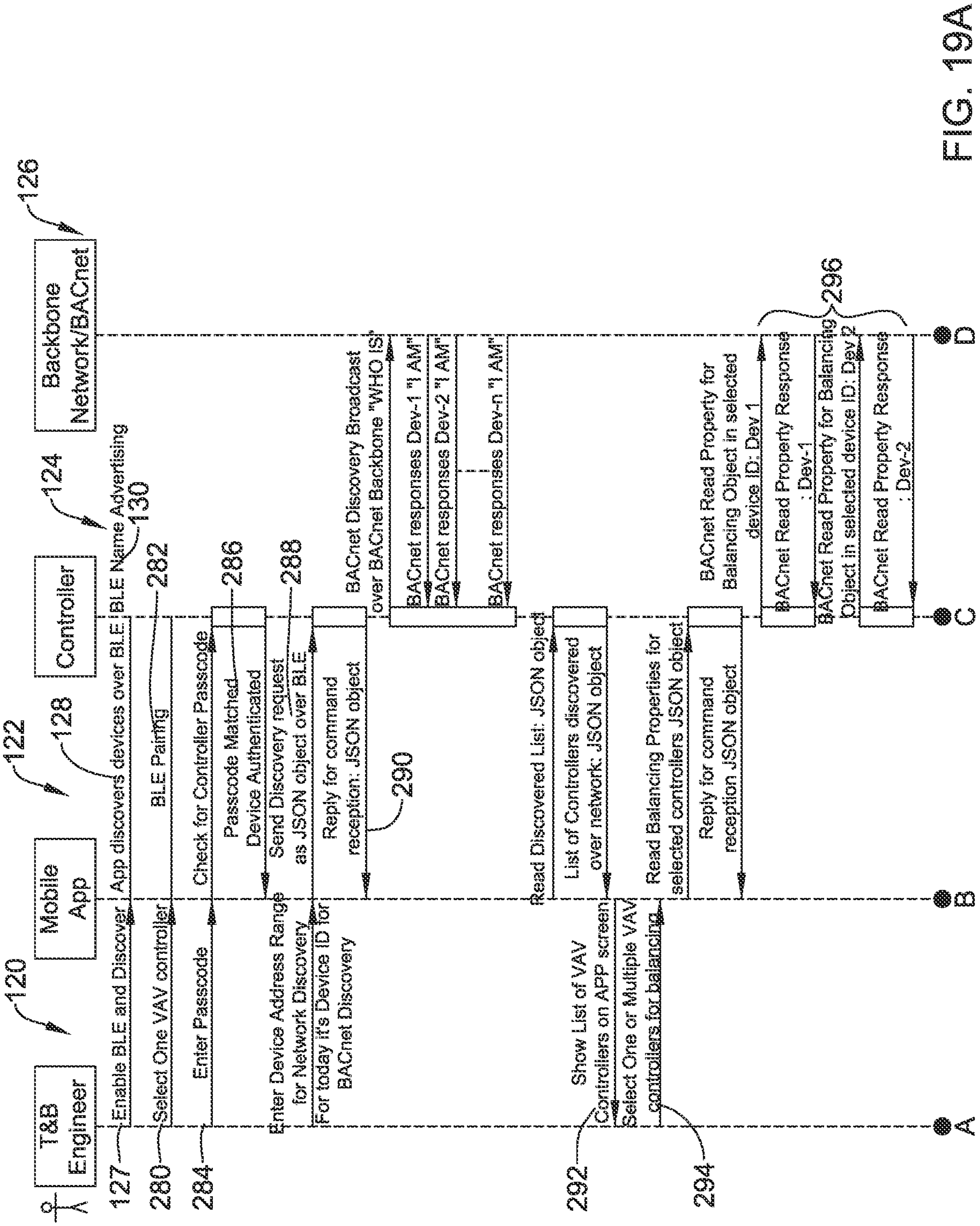
FIGS. 19A, 19B and 19C together form a flow diagram showing an illustrative method.
Figure 19B:
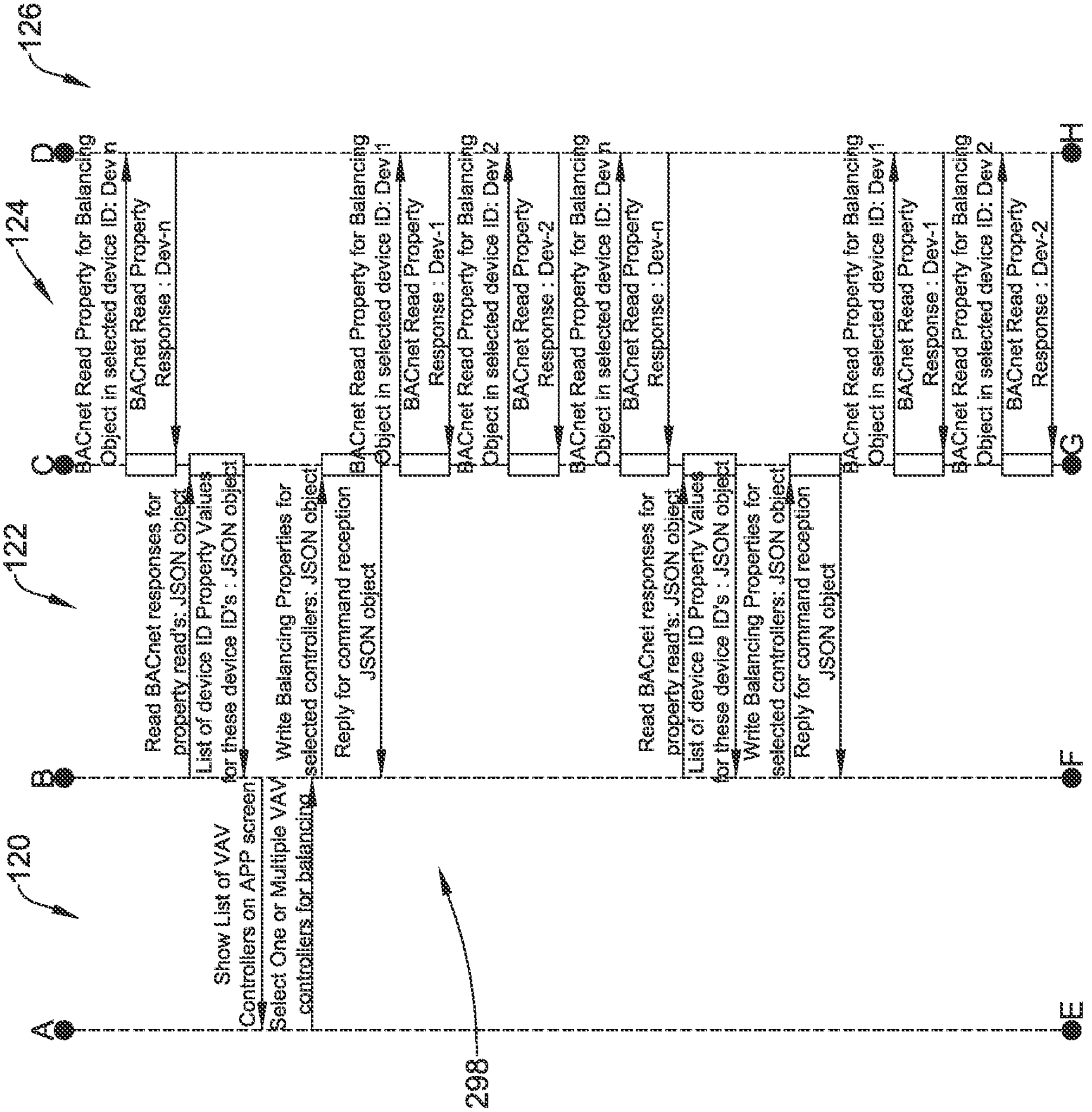
Figure 19C:
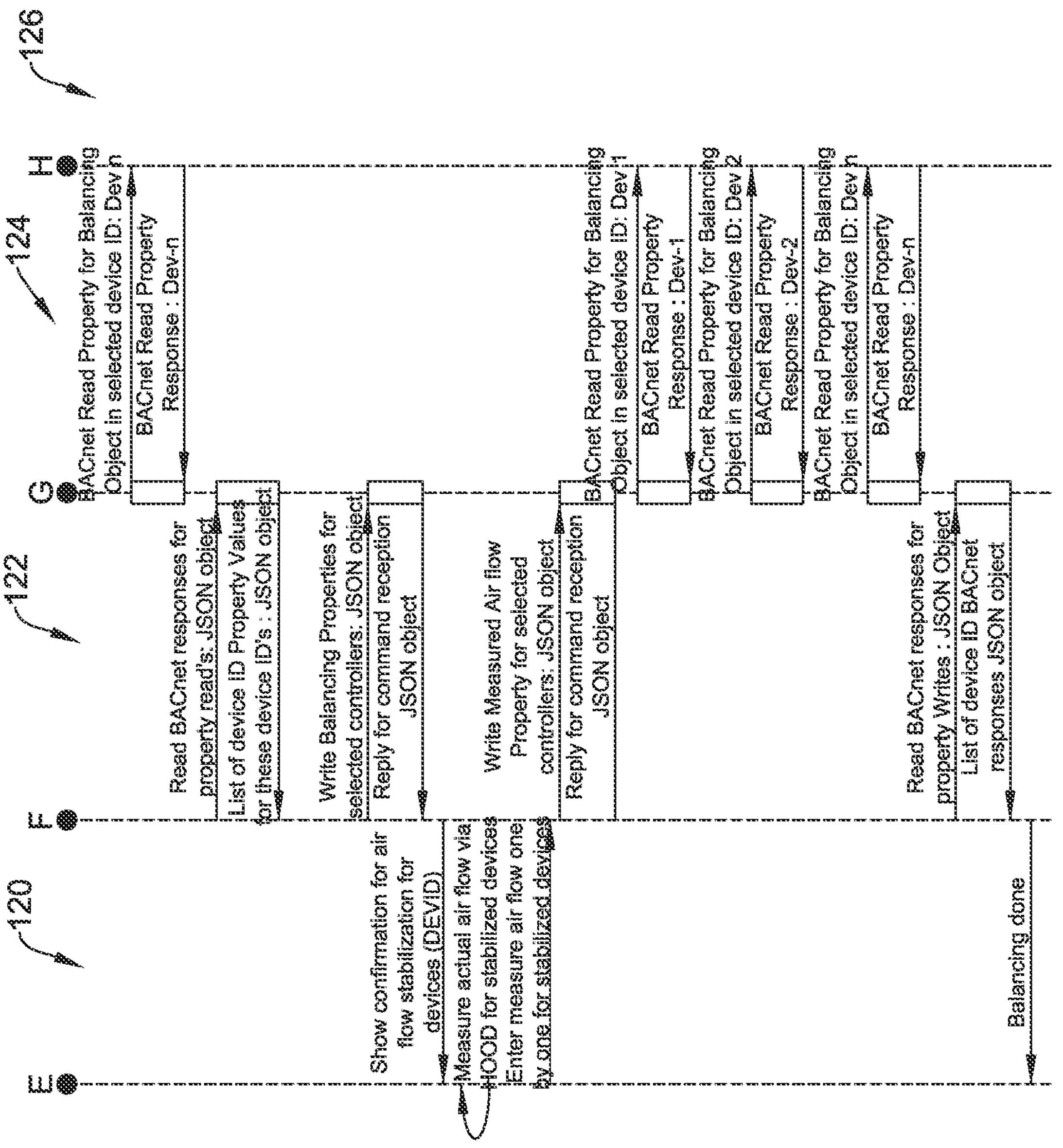

FIGS. 19A, 19B and 19C together provide a flow diagram showing an illustrative method of performing a Test and Balance procedure. A column 120 outlines the steps that the installer or other professional carries out using their portable handheld device. A column 122 outlines the steps that are carried out by a mobile application running on a portable handheld device. A column 124 outlines the steps that are carried out by a controller within a particular VAV assembly that is undergoing a test and balance procedure. A column 126 represents the activity of the HVAC control network. The columns 120, 122, 124 and 126 also outline how information is moved back and forth, and how the actions in one column impact what happens as shown in the other columns.

As an example, the installer or other processional uses their portable handheld device to enable BLE and a Discovery process, indicated at point 127. In response, the mobile application running on the portable handheld device discovers devices over BLE, as indicated at point 128. In response, a particular controller may advertise its name, location and possibly other details, as indicated at point 130. This back and forth between columns 120, 122, 124 and 126 continues. It will be appreciated that in FIG. 19A, the columns terminate at points A, B, C and D, respectively. In FIG. 19B, the columns continue from the same points A, B, C and D, and terminate at points E, F, G and H. In FIG. 19C, the columns continue from the same points E, F, G and H.

As an illustrative but non-limiting example, an illustrative Test and Balance procedure carried out using an application running on a portable handheld device such as the portable handheld device may include a number of steps:

Step 1: The mobile application conducts Bluetooth discovery, as referenced at point 128.

Step 2: A list of Bluetooth devices that were found appears on a screen of the portable handheld device, as referenced at point 130. In some cases, the mobile application may include a filtering mechanism that excludes devices that are not relevant to the Test and Balance procedure. In some cases, the filtering mechanism may exclude devices made by a particular manufacturer, for example.

Step 3: The user selects one of the discovered devices (in this example, the selected device can be referred to as blePairedDevice) from the list of Bluetooth-discovered devices, as at reference point 280, and Bluetooth pairing between the mobile application and blePairedDevice occurs, as referenced at point 282.

Step 4: The user gets a pop-up that appears on the mobile application, instructing them to enter a passcode, as referenced at point 284. In some cases, this is the same passcode that is configured for a controller during its commissioning workflow using commissioning tools or any other mechanism.

Step 5: The user enters the passcode on the mobile application and the mobile application validates the passcode over Bluetooth with the controller, as referenced at point 286.

Step 6: Once the passcode has been validated, the user gets a window for discovering other controllers over a building control network such as but not limited to BACnet.

Step 7: The mobile application sends a discovery command to blePairedDevice, and this device will act as a gateway to send network discovery commands on the building control network, as referenced at point 288.

Step 8: BlePairedDevice will receive the discovery responses from the building control network and will send these responses over Bluetooth (such as via JSON object structure) to the mobile application, as referenced at point 290. In some cases, because blePairedDevice acts as a gateway, the user is able to balance any remotely connected controller or controller sitting on the building control network (such as a backbone network), even those that lack Bluetooth connectivity.

Step 9: The user will see a list of network controllers listed on the mobile application, as referenced at point 292.

Step 10: The user will select one (or more) of the controllers as listed in the mobile application and then can see balancing options for the selected controller(s), as referenced at point 294. The selected controller(s) may be blePairedDevice or any other controller that was discovered over the building control network. The mobile application will send commands to blePairedDevice over Bluetooth and then blePairedDevice will translate those commands into network commands and then push those network commands to the building control network, sometime as READ or WRITE commands (such as BACnet read and write properties for balancing routines). In some cases, the balancing routine runs inside the controller. The mobile application will periodically read the balancing routine values from the controller (BACnet read properties), as referenced at point 296.

Once the mobile application sees that the airflow shown by the controller is in balancing range, it will ask the user to measure the actual flow using an external device such as a portable air hood, and to enter the measured value in the mobile application, as referenced at point 298. The mobile application will send the measured flow to the controller, which will trigger a completion command to the controller. The controller will calculate balancing parameters and save them to memory. The mobile application can also read the balanced parameters. The mobile application can issue a command to the controller to use the balancing parameters in their application, and then balancing for the controller is completed.

Step 11: The user can select multiple controllers and thus can trigger balancing commands for multiple controllers at the same time.

Step 12: There may be multiple controllers on a particular floor of a building, and the user can move around the floor to different places in order to obtain the airflow measurements.

Step 13: If the user has triggered a balancing routine while the mobile application was connected to blePairedDevice, the Bluetooth signal from blePairedDevice may weaken as the user moves across the floor. When this occurs, the BLE connection may be disconnected, but the initiated balancing procedure(s) are not interrupted because the test and balancing procedures are controlled by the controllers. Via seamless BLE (Bluetooth Low Energy), when the user moves around, the mobile application looks for other BLE sources in the vicinity. As a result, if the Bluetooth signal from the connected device (e.g. blePairedDevice) gets weak, the mobile application can takes several steps. The mobile application may disconnect from the currently connected device (blePairedDevice in this example) and initiate pairing with another device with a stronger signal. The mobile application may inform the newly paired device of the previously started balancing procedure, and will use the newly paired device to seamlessly monitor and control the previously initiated test and balancing procedure. As a result, the user of the mobile device does not see any disruptions in the test balancing procedures.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of using a portable handheld device to commission and/or maintain one or more of a plurality of building control devices that are operably connected together via a building control network, at least some of the plurality of building control devices configured for communication with the portable handheld device over a wireless connection, the method comprising:

the portable handheld device pairing with a first one of the plurality of building control devices that are configured for communication with the portable handheld device, thereby forming a first wireless connection;

the portable handheld device receiving information about a second one of the plurality of building control devices via the first wireless connection, at least some of the information is received by the first one of the plurality of building control devices from the second one of the plurality of building control devices over the building control network before the first one of the plurality of building control devices provides at least some of the received information to the portable handheld device via the first wireless connection; and the portable handheld device sending one or more messages to the first one of the plurality of building control devices via the first wireless connection, wherein the one or more messages cause the first one of the plurality of building control devices to communicate with the second one of the plurality of building control devices via the building control network to initiate a commissioning and/or maintenance process of the second one of the plurality of building control devices;

the portable handheld device:

terminating the first wireless connection with the first one of the plurality of building control devices;

pairing with another one of the plurality of building control devices that are configured for communication with the portable handheld device, thereby forming a second wireless connection; and monitoring and/or controlling via the second wireless connection the commissioning and/or maintenance process of the second one of the plurality of building control devices that was previously initiated by the portable handheld device using the first wireless connection without having to restart the commissioning and/or maintenance process.

2. The method of claim 1, wherein the second one of the plurality of building control devices comprises a Variable Air Volume (VAV) controller associated with a VAV box, and the commissioning and/or maintenance process comprises a test and balance procedure for the Variable Air Volume (VAV) controller.

3. The method of claim 1, wherein the wireless connection comprises a Bluetooth connection, and the building control network comprises a BACNET network.

4. The method of claim 1, further comprising:

the portable handheld device:

monitoring a signal strength associated with the first wireless connection; and terminating the first wireless connection when the signal strength associated with the first wireless connection falls below a threshold.

5. The method of claim 4, further comprising:

the portable handheld device:

monitoring a signal strength from each of the plurality of building control devices that are configured for communication with the portable handheld device; and pairing with another of the plurality of building control devices that has a signal strength that is above a threshold.

6. A method of using a portable handheld device to commission and/or maintain one or more of a plurality of building control devices that are operably connected together via a building control network, at least some of the plurality of building control devices configured for communication via a wireless network, the method comprising:

the portable handheld device selecting a building control device to communicate with based at least in part on a signal strength available for communicating over the wireless network with the selected building control device;

the portable handheld device initiating a wireless connection with the selected building control device and initiating a commissioning and/or maintenance process for one or more of the plurality of building control devices, the one or more of the plurality of building control devices optionally including the selected building control device;

the portable handheld device monitoring a signal strength of a wireless signal emanating from the at least some of the plurality of building control devices in order to ascertain relative signal strengths;

when a signal strength of a wireless signal emanating from another of the plurality of building control devices is stronger than a signal strength of a wireless signal emanating from the selected building control device by at least a threshold amount, the portable handheld device:

selecting the building control device that has a stronger signal strength for the wireless signal emanating from the building control device as a newly selected building control network device;

initiating a new wireless connection with the newly selected building control device;

terminating the existing wireless connection with the previously selected building control device; and continuing via the new wireless connection the commissioning and/or maintenance process for the one or more of the plurality of building control devices that was initiated using the terminated wireless connection without having to restart the commissioning and/or maintenance process.

7. The method of claim 6, wherein the portable handheld device is configured to communicate wirelessly with the selected building control device, and the selected building control device allows the portable handheld device to communicate with other building control devices over the building control network.

8. The method of claim 6, wherein the portable handheld device is configured to communicate wirelessly with the newly selected building control device, and the newly selected building control device allows the portable handheld device to communicate with other building control devices over the building control network.

9. The method of claim 6, wherein the wireless network comprises a Bluetooth or a WiFi network.

10. The method of claim 6, wherein the commissioning and/or maintenance process comprises an install and checkout procedure.

11. The method of claim 10, wherein the install and checkout procedure for a particular building control device comprises configuring a point type.

12. The method of claim 10, wherein the install and checkout procedure for a particular building control device comprises configuring a point behavior.

13. The method of claim 6, wherein the selected building control device comprises a Variable Air Volume (VAV) controller associated with a VAV box, and the commissioning and/or maintenance process comprises a test and balance procedure for the Variable Air Volume (VAV) controller.

14. The method of claim 6, wherein the plurality of building control devices comprise a plurality of VAV (variable air volume) controllers that are each associated with a corresponding VAV box, and wherein the test and balance procedure includes moving between VAV boxes in order to measure air flow at each of the VAV boxes, and the relative signal strength of the wireless signals emanating from at least some of the plurality of building control devices as measured at the portable handheld device varies as a user moves the portable handheld device as they measure air flow at each of the VAV boxes.

15. A method of performing a test and balance procedure on a plurality of Variable Air Volume (VAV) controllers that are each associated with a corresponding VAV box, each of the VAV controllers operably coupled via a Heating, Ventilating and Air Conditioning (HVAC) control network, at least some of the VAV boxes equipped to communicate via a wireless communication protocol, the method comprising:

a portable handheld device selecting a VAV controller to communicate with based at least in part on a signal strength available for communicating with the selected VAV controller;

the portable handheld device initiating a wireless connection with the selected VAV controller and initiating a test and balance procedure for one or more of the VAV controllers, the one or more of the VAV controllers optionally including the selected VAV controller;

the portable handheld device monitoring a signal strength of a wireless signal emanating from the at least some of the plurality of VAV controllers in order to ascertain relative signal strengths;

when a signal strength of a wireless signal emanating from another of the plurality of VAV controllers is stronger than a signal strength of a wireless signal emanating from the selected VAV controller, the portable handheld device:

selecting the VAV controller that has a stronger signal strength for the wireless signal emanating from the VAV controller as the newly selected VAV controller;

initiating a new wireless connection with the newly selected VAV controller;

terminating the existing wireless connection with the previously selected VAV controller; and continuing via the new wireless connection the test and balance procedure for the one or more VAV controllers that was initiated using the terminated wireless connection without having to restart the test and balance procedure for the one or more VAV controllers.

16. The method of claim 15, wherein the test and balance procedure includes moving between VAV boxes in order to measure air flow at each of the VAV boxes, and the relative signal strength of the wireless signals emanating from at least some of the plurality of VAV controllers as measured at the portable handheld device varies as a user moves the portable handheld device as they measure air flow at each of the VAV boxes.

17. The method of claim 15, wherein the portable handheld device is configured to communicate wirelessly with the selected VAV controller, and the selected VAV controller is configured to act as an intermediary between the portable handheld device and the other VAV controllers.

18. The method of claim 15, wherein the portable handheld device is configured to communicate wirelessly with the newly selected VAV controller, and the newly selected VAV controller is configured to act as an intermediary between the portable handheld device and the other VAV controllers.

19. The method of claim 15, wherein the wireless connection comprises a Bluetooth connection.

* * * * *